(12) United States Patent
Nakahata et al.

(10) Patent No.: US 9,349,310 B2
(45) Date of Patent: May 24, 2016

(54) DISPLAY DEVICE FOR DISPLAYING TWO-DIMENSIONAL AND THREE-DIMENSIONAL IMAGES WITHOUT A BLACK MATRIX

(75) Inventors: Yuji Nakahata, Kanagawa (JP); Tomoya Yano, Kanagawa (JP)

(73) Assignee: Sony Corporation (JP)

( * ) Notice: Subject to any disclaimer, the term of this patent is extended or adjusted under 35 U.S.C. 154(b) by 179 days.

(21) Appl. No.: 13/698,115

(22) PCT Filed: Feb. 16, 2012

(86) PCT No.: PCT/JP2012/053683
§ 371 (c)(1),
(2), (4) Date: Nov. 15, 2012

(87) PCT Pub. No.: WO2012/127945
PCT Pub. Date: Sep. 27, 2012

(65) Prior Publication Data
US 2013/0063327 A1    Mar. 14, 2013

(30) Foreign Application Priority Data

Mar. 22, 2011   (JP) .................................. 2011-62081

(51) Int. Cl.
*G09G 3/00*        (2006.01)
*G02B 27/26*       (2006.01)
(Continued)

(52) U.S. Cl.
CPC ................ *G09G 3/003* (2013.01); *G02B 27/26* (2013.01); *G09G 3/3611* (2013.01); *H04N 13/0434* (2013.01); *H04N 13/0452* (2013.01); *G09G 2300/023* (2013.01); *G09G 2300/0452* (2013.01)

(58) Field of Classification Search
CPC ................ G09G 3/003; G09G 3/3611; G09G 2300/0452; G09G 2300/023; H04N 13/0452; H04N 13/0434; G02B 27/26
USPC .................................. 345/32, 695; 348/51–60
See application file for complete search history.

(56) References Cited

U.S. PATENT DOCUMENTS 7,215,302 B2   5/2007 Satoh et al.
7,920,216 B2 * 4/2011 Hsu .................... G02B 27/2214
                                                     348/51

(Continued)

FOREIGN PATENT DOCUMENTS

EP          0541295 A2    5/1993
EP          2227026 A1    9/2010
(Continued)

OTHER PUBLICATIONS

Supplementary European Search Report from EP Application No. 12760053, dated Oct. 11, 2013.

(Continued)

*Primary Examiner* — Rodney Amadiz
(74) *Attorney, Agent, or Firm* — Lerner, David, Littenberg, Krumholz & Mentlik, LLP

(57) ABSTRACT

The generation of crosstalk is suppressed when displaying a three-dimensional image, and a decrease in brightness is avoided when displaying a two-dimensional image.
A polarization control filter 268 is placed so that a boundary between a polarization region 269a and a polarization region 269b is within the ranges of a red liquid crystal cell 272, a green liquid crystal cell 274, and a blue liquid crystal cell 276 in order in the vertical direction. When displaying a three-dimensional image, black is displayed for a liquid crystal cell 2 positioned at a boundary between the polarization region 269a and the polarization region 269b of a polarization control filter 268, and the original right eye image or left eye image is displayed by other liquid crystal cells.

3 Claims, 17 Drawing Sheets

(51) Int. Cl.
*G09G 3/36* (2006.01)
*H04N 13/04* (2006.01)

(56) References Cited

U.S. PATENT DOCUMENTS

| | | | | |
|---|---|---|---|---|
| 2004/0227890 A1* | 11/2004 | Chung | ............. | G02F 1/134363 349/141 |
| 2007/0159492 A1* | 7/2007 | Lo | ............. | G09G 5/026 345/589 |
| 2008/0278466 A1* | 11/2008 | Joo | ............. | G09G 3/3614 345/205 |
| 2008/0316398 A1* | 12/2008 | Woo | ............. | G02F 1/1323 349/110 |
| 2009/0213256 A1* | 8/2009 | Kudoh | ............. | H01L 27/14603 348/302 |
| 2009/0225103 A1* | 9/2009 | Shiomi | ............. | G02F 1/133514 345/690 |
| 2010/0225682 A1 | 9/2010 | Nakahata | | |
| 2010/0231564 A1* | 9/2010 | Min | ............. | G09G 3/3648 345/209 |
| 2010/0238102 A1* | 9/2010 | Nakamura et al. | ............. | 345/88 |
| 2011/0122239 A1* | 5/2011 | Baik et al. | ............. | 348/58 |
| 2011/0148908 A1* | 6/2011 | Jeong | ............. | G09G 5/02 345/590 |
| 2011/0221744 A1* | 9/2011 | Bae et al. | ............. | 345/419 |
| 2012/0154392 A1* | 6/2012 | Kim et al. | ............. | 345/419 |
| 2012/0320173 A1* | 12/2012 | Kim et al. | ............. | 348/60 |

FOREIGN PATENT DOCUMENTS

| | | |
|---|---|---|
| JP | 2001-197523 A | 7/2001 |
| JP | 2002-365593 A | 12/2002 |
| JP | 2003202519 A | 7/2003 |
| JP | 2009003002 A | 1/2009 |
| JP | 2010-204389 A | 9/2010 |
| JP | 2010-250257 A | 11/2010 |
| WO | 2012073795 A1 | 6/2012 |
| WO | 2012105369 A1 | 8/2012 |

OTHER PUBLICATIONS

Japanese Office Action for JP Application No. 2011062081, dated Nov. 18, 2014.

* cited by examiner

DISPLAY DEVICE FOR DISPLAYING TWO-DIMENSIONAL AND THREE-DIMENSIONAL IMAGES WITHOUT A BLACK MATRIX

CROSS-REFERENCE TO RELATED APPLICATION

The present application is a national phase entry under 35 U.S.C. §371 of International Application No. PCT/JP2012/053683 filed Feb. 16, 2012, published on Sep. 27, 2012 as WO 2012/127945 A1, which claims priority from Japanese Patent Application No. JP 2011-062081 filed in the Japanese Patent Office on Mar. 22, 2011.

TECHNICAL FIELD

The present invention relates to a display device including a display screen formed of an arrangement of a plurality of pixels, each pixel being formed by a plurality of liquid crystal cells respectively including an individual bus line, and particularly relates to a display device maintaining brightness when displaying a two-dimensional image while suppressing the generation of crosstalk when displaying a three-dimensional image.

A 3D image that appears stereoscopically can be presented to a viewer by displaying an image with parallax between the left and right eyes. The application of 3D image technology is expected in a variety of fields such as television broadcasting, films, remote communication, and remote medicine.

One example of a method of presenting a stereoscopic image is to have the viewer wear glasses with special optical characteristics to present an image with binocular parallax. For example, by changing the polarization state between a right eye image and a left eye image on the display device side while the viewer wears glasses differentiating the polarization state between left and right so that the right eye image and the left eye image can be respectively seen by the right eye and the left eye, the viewer can stereoscopically view an image displayed on a screen.

One example of a method of changing the polarization state between a right eye image and a left eye image is a method of placing polarization control filters known as μ-pols (μ-pol) with different polarization states on each display region of the right eye image and the left eye image (for example, refer to Japanese Unexamined Patent Application Publication No. 2010-204389). A μ-pol is an optical system configured by miniscule polarization elements, and changes the polarization state between the right eye image and the left eye image.

A display method of a three-dimensional image using a polarization method using μ-pols is illustrated in FIG. 15. While polarization elements alternately orthogonal to each row of pixels are arranged to match rows of pixels on a liquid crystal display (LCD), the liquid crystal display alternately outputs a left eye image signal L and a right eye image signal R for each row of pixels. When the viewer observes the display image, the left eye image and the right eye image are separated by polarization glasses corresponding to each of the left and right polarization directions. In the drawing, the corresponding polarization directions are represented by diagonal lines.

The principle of separating the left eye image and the right eye image through a polarization method using μ-pols will be described with reference to FIG. 16. In FIG. 16, a display device displaying a three-dimensional image is viewed from the side. A display device 10 illustrated in the drawing includes a backlight 11, polarizing plates 12a and 12b, a liquid crystal display element 13, and a polarization control filter 14.

The display device 10 alternately displays right eye images R1, R2, R3, . . . and left eye images L1, L2, L3, . . . for each row of pixels through the application of image signals. Here, R represents a right eye image and L represents a left eye image, and the numbers are the serial numbers for the pixel rows.

Light from the backlight 11 is polarized by the polarizing plates 12a and 12b and the liquid crystal display element 13. Furthermore, light that has transmitted through the polarizing plate 12b is circularly polarized by the polarization control filter 14 placed to the front of the polarizing plate 12b. Polarization regions 14a and 14b respectively including a ±¼ wavelength plate are placed on the polarization control filter 14 to correspond to rows of pixels of the right eye image or the left eye image in order to circularly polarize the light that has transmitted through the polarizing plate 12b to either right circularly polarized light or left circularly polarized light. The respective optical axes of the polarization region 14a and the polarization region 14b are orthogonal to each other. For example, light of the right eye images R1, R2, R3, . . . is right circularly polarized by the polarization region 14a and light of the left eye images L1, L2, L3, . . . is left circularly polarized by the polarization region 14b.

On the other hand, polarization glasses 20 include a right eye image transmission unit 21 and a left eye image transmission unit 22. The right eye image transmission unit 21 includes a ¼ wavelength plate and a polarization lens (not shown) so that right circularly polarized light can be transmitted. Further, the left eye image transmission unit 22 includes a −¼ wavelength plate and a polarization lens (not shown) so that left circularly polarized light can be transmitted. The right eye image transmission unit 21 blocks the left circularly polarized light while the left image transmission unit 22 blocks the right circularly polarized light. Therefore, only the light of the right eye images R1, R2, R3, . . . is incident on the right eye of the viewer wearing the polarization glasses 20, and only the light of the left eye images L1, L2, L3, . . . is incident on the left eye.

By the viewer viewing the circularly polarized light through the polarization glasses 20 in such a manner, the viewer can view stereoscopically by separately seeing the right eye image and the left eye image with parallax.

Here, with a display device using a polarization control filter, there is a problem in that the division of light is insufficient at a boundary at which the polarization state of the filter changes. If the division of light is insufficient, a phenomenon in which a portion of the right eye image and a portion of the left eye image respectively leak into the left eye and the right eye, that is, crosstalk, is generated.

In the example illustrated in FIG. 16, the polarization control filter 14 controls the direction of circular polarization using the two polarization regions 14a and 14b. Here, if the division of light at the boundary between the polarization region 14a and the polarization region 14b is insufficient, when the viewer views light from the display device 10 through the polarization glasses 20, crosstalk in which a portion of the right eye image and a portion of the left eye image respectively leak into the left eye and the right eye is generated.

In order to suppress the generation of such crosstalk, a method of arranging a black matrix at the boundary portion in which the polarization state of the filter changes is considered. By arranging a black matrix at the boundary portion in which the polarization state of the polarization control filter changes, the generation of crosstalk can be suppressed by causing light from a portion of the right eye image and a portion of the left eye image not to respectively mix into the left eye and the right eye.

An example of a polarization control filter 14 including a black matrix 14c is illustrated in FIG. 17. In FIG. 17, the arrangement of pixels in the liquid crystal display element 13 is also illustrated. A unit pixel of the liquid crystal display element 13 is configured by a combination of liquid crystal cells of three colors of a red liquid crystal cell 13a emitting red (R), a green liquid crystal cell 13b emitting green (G), a liquid crystal cell pixel 13c emitting blue (B). Here, the example shown in the drawing is a vertical arrangement structure in which liquid crystal cells of each horizontal line is arranged in a different color.

As described above, the display device 10 alternately displays the right eye images R1, R2, R3, . . . and the left eye images L1, L2, L3, . . . for each row of pixels through the application of image signals. The black matrix 14c is arranged corresponding to the boundary portion between a row of pixels displaying a left eye image and a row of pixels displaying a right eye image. Therefore, by the division of light being performed at the boundary between the polarization region 14a and the polarization region 14b, the generation of crosstalk when the viewer views light from the display device 0 through the polarization glasses 20 is suppressed.

According to such a display device, it is also possible to display an ordinary two-dimensional image in addition to a three-dimensional image that a viewer can view stereoscopically. When displaying a three-dimensional image, the right eye image and the left eye image are displayed at the same time, the polarization state of each is changed using the polarization control filter, and the viewer views an image while wearing glasses in which the polarization state is changed between left and right. Further, when displaying a two-dimensional image, the viewer may view an image without wearing the glasses. However, if a black matrix is arranged at a boundary portion in which the polarization state of the polarization control filter changes, there is a problem in that the brightness decreases by an amount corresponding to the blocking by the black matrix when an ordinary two-dimensional picture is displayed on the screen.

In the example illustrated in FIG. 17, since light transmitting through each liquid crystal cell 13a, 13b, and 13c is blocked at locations where the black matrix 14c is arranged, the brightness of the displayed image decreases. In particular, when displaying an ordinary image (two-dimensional image), there is a problem in that even though the division of light is unnecessary, brightness decreases due to the presence of the black matrix 14c. Further, when displaying a three-dimensional image, if the viewing angle of the viewer wearing the polarization glasses 20 is large, light of an adjacent right eye image one pixel row above (or below) leaks from the left eye polarization region 14b, causing crosstalk. While crosstalk can be suppressed even if the viewing angle is large if the width of the black matrix 14c is increased, the brightness then decreases still further.

CITATION LIST

Patent Literature

PTL 1: Japanese Unexamined Patent Application Publication No. 2010-204389

SUMMARY OF INVENTION

Technical Problem

The present invention provides an excellent display device that can display both two-dimensional images and three-dimensional images, suppressing the generation of crosstalk when displaying a three-dimensional image while avoiding a decrease in brightness when displaying a two-dimensional image.

Solution to Problem

The present application considers the problem described above, and an invention according to claim 1 is a display device including:

a display panel configured by sequentially arranging a plurality of pixels in the horizontal direction and the vertical direction with one pixel being formed by a plurality of color component cells respectively including an individual bus line, and displaying a two-dimensional or a three-dimensional image through the application of a signal to the bus line;

a polarization control filter placed to the front of the display panel, alternately changing the polarization state of light transmitting the panel unit for every predetermined horizontal region; and a signal control unit controlling the signal applied to the bus line when displaying a two-dimensional image or a three-dimensional image on the display panel, wherein the polarization control filter is arranged so that each boundary at which the polarization state changes is within the range of one row of cells, wherein the signal control unit controls the application of a signal to the bus line when displaying a three-dimensional image so that each row of cells positioned at a boundary at which the polarization state of the polarization control filter changes is displayed in black.

According to an invention according to claim 2 of the present application, according to the display device according to claim 1, each pixel of the display panel respectively includes cells of three colors of red, green, and blue. Furthermore, when displaying a three-dimensional image, when a portion of the cells is displayed in black as described above, a boundary at which the polarization state of the polarization control filter changes is arranged so that a constituent ratio of red, green, and blue on the display panel is the same as when displaying a two-dimensional image.

According to an invention according to claim 3 of the present application, each pixel of the display panel of the display device according to claim 1 respectively includes cells of the three colors of red, green, and blue, and cells of a color other than red, green, and blue. Furthermore, the signal control unit is configured to control the application of a signal to the bus line when displaying a three-dimensional image so that the cells of a color other than red, green, and blue are displayed in black.

According to an invention according to claim 4 of the present application, each pixel of the display panel of the display device according to claim 1 arranges cells of N colors in order in the vertical direction (where N is an integer equal to or greater than 2), and the display panel has a horizontal arrangement structure of arranging cells of each horizontal line in the same color. Further, the polarization control filter is arranged so that each boundary at which the polarization state changes is within the range of every row with N rows of cells therebetween. Furthermore, the signal control unit is configured to control the application of a signal to the bus line when displaying a three-dimensional image so that each row of cells with three rows therebetween positioned at a boundary at which the polarization state of the polarization control filter changes is displayed in black.

According to an invention according to claim 5 of the present application, each pixel of the display panel of the display device according to claim 1 arranges cells of four colors formed of the three colors of red, green, and blue and a color other than the three colors in order in the vertical direction, and the display panel has a horizontal arrangement structure of arranging cells of each horizontal line in the same color. Further, the polarization control filter is arranged so that each boundary at which the polarization state changes is within the range of every row of cells in the color other than the three colors. Furthermore, the signal control unit is configured to control the application of a signal to the bus line when displaying a three-dimensional image so that each row of cells in the color other than the three colors is displayed in black.

According to an invention according to claim 6 of the present application, each pixel of the display panel of the display device according to claim 1 is configured by arranging cells of four colors formed of three colors of red, green, and blue, and a color other than the three colors in two rows and two columns. Further, the polarization control filter is arranged so that each boundary at which the polarization state changes is within the range of every row with two rows of cells therebetween. Furthermore, the signal control unit is configured to control the application of a signal to the bus line when displaying a three-dimensional image so that each row of cells with two rows therebetween positioned at a boundary at which the polarization state of the polarization control filter changes is displayed in black.

According to an invention according to claim 7 of the present application, the display panel of the display device according to claim 1 is configured by arranging cells of four colors formed of the three colors of red, green, and blue and a color other than the three colors in order in the horizontal direction, and shifting a formation position of each color by two columns for each row of cells. Further, the polarization control filter is arranged so that each boundary at which the polarization state changes is within the range of every row with one row of cells therebetween. Furthermore, the signal control unit is configured to control the application of a signal to the bus line when displaying a three-dimensional image so that each row of cells with a row therebetween positioned at a boundary at which the polarization state of the polarization control filter changes is displayed in black.

According to an invention according to claim 8 of the present application, the display panel of the display device according to claim 1 is configured by arranging cells of four colors formed of the three colors of red, green, and blue and a color other than the three colors in order in the horizontal direction, and shifting a formation position of each color by two columns for each row of cells. Further, the polarization control filter is arranged so that each boundary at which the polarization state changes is within the range of every row with two rows of cells therebetween. Furthermore, the signal control unit is configured to control the application of a signal to the bus line when displaying a three-dimensional image so that each row of cells with two rows therebetween positioned at a boundary at which the polarization state of the polarization control filter changes is displayed in black.

Advantageous Effects of Invention

According to the present invention, it is possible to provide an excellent display device that can display both two-dimensional images and three-dimensional images, suppressing the generation of crosstalk when displaying a three-dimensional image while avoiding a decrease in brightness when displaying a two-dimensional image.

According to the present invention, since the division of light at a boundary at which the polarization state of the polarization control filter changes is realized without a black matrix by providing a row of pixels that are constantly displayed in black when displaying a three-dimensional image and arranging a boundary portion at which the polarization state of the polarization control filter changes to match the row of pixels displayed in black, crosstalk can be suppressed when displaying a three-dimensional image while maintaining brightness when displaying a two-dimensional image.

Other objects, characteristics, and advantages of the present invention will be made clear in the more detailed description based on embodiments of the present invention described later and the attached drawings.

DESCRIPTION OF EMBODIMENTS

Embodiments of the present invention will be described in detail below with reference to the drawings.

Figure 1:
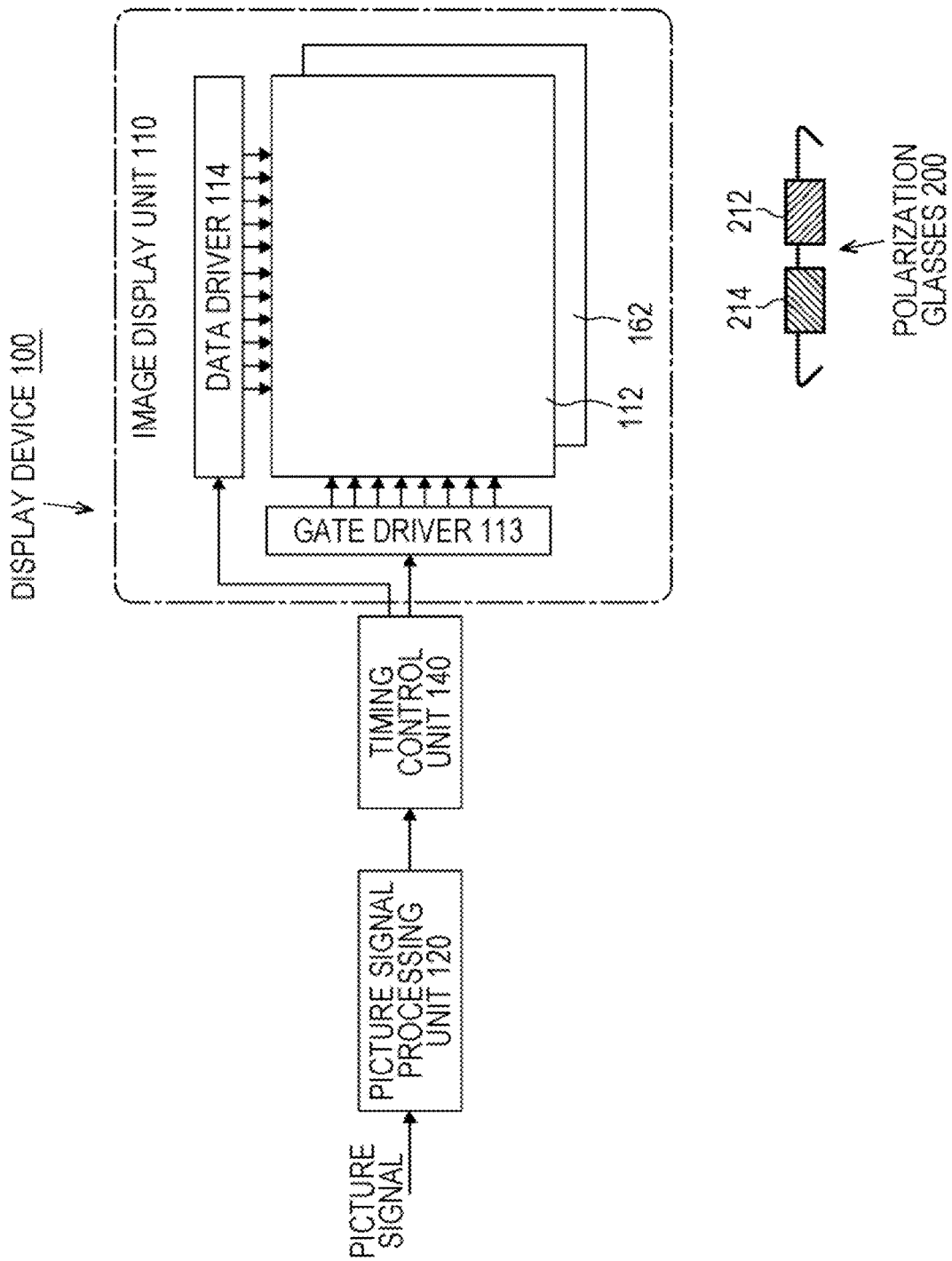
FIG. 1 is a view schematically illustrating the functional configuration of a display device 100 displaying both two-dimensional images and three-dimensional images.

The functional configuration of a display device 100 displaying both two-dimensional images and three-dimensional images is schematically illustrated in FIG. 1. Further, polarization glasses 200 for the viewer to perceive an image that the display device 100 displays as a stereoscopic image is also illustrated in FIG. 1.

The display device 100 includes an image display unit 110, a picture signal control unit 120, and a timing control unit 140.

The image display unit 110 performs the display of an image according to a signal applied from the outside. The image display unit 110 includes a display panel 112, a gate driver 113, a data driver 114, and a light source 162.

Liquid crystal molecules with a predetermined orientation state are enclosed between transparent plates such as glass in the display panel 112, which displays an image according to the application of a signal from the outside. The application of signal to the display panel 112 is executed by the gate driver 113 and the data driver 114. While the display panel 112 is described as being driven using a TN (Twisted Nematic) method in the following description, the gist of the present invention is not limited to a specific driving method, and the display panel 122 may be driven using a driving method such as a VA (Vertical Alignment) method or an IPS (In-Place-Switching) method. In a case where the driving method of the display panel 112 is a method other than the TN method, liquid crystal molecules with no twist between the polarizing plates may be enclosed in the liquid crystal display panel 112.

The gate driver 113 is a driving circuit driving a gate bus line (not shown) of the display panel 112, and outputs a signal to the gate bus line according to a signal transmitted from the timing control unit 140. Further, the data driver 114 is a driving circuit generating a signal to be applied to a data line (not shown) of the display panel 112, and generates and outputs a signal to be applied to the data line according to a signal transmitted from the timing control unit 140.

The light source 162 is a backlight provided furthest to the back of the image display unit 110 when viewed from the viewer side. When displaying an image on the image display unit 110, unpolarized white light is emitted from the light source 162 to the display panel 112 positioned on the viewer side.

Here, while an embodiment using a liquid crystal display as the image display unit 110 will be described in the present specification, the gist of the present invention is not limited thereto. For example, the present invention can be similarly applied to other displays such as an OLED (Organic Light Emitting Diode) or an LED (Light Emitting Diode) configured to form a pixel by cells of a plurality of color components and sequentially arranging a plurality of pixels in the horizontal direction and the vertical direction.

When the picture signal control unit 120 receives the transmission of a picture signal from the outside of the picture signal control unit 120, the picture signal control unit 120 outputs the received picture signal by executing various signal processes so that the picture signal is suited to the display of a three-dimensional image or a two-dimensional image on the image display unit 110. A picture signal that is signal processed by the picture signal control unit 120 is transmitted to the timing control unit 140. In a case where a right eye picture signal and a left eye picture signal are transmitted, the picture signal control unit 120 generates a picture signal for a three-dimensional image from the two picture signals. Specifically, a picture signal for a three-dimensional image is generated by the picture signal control unit 120 so that the right eye image is displayed on odd rows of the scanning line of the display panel on the image display unit 110, and the left eye image is displayed on even rows.

The timing control unit 140 generates a pulse signal used in the operation of the gate driver 113 and the data driver 114 according to a signal transmitted from the picture signal control unit 120. Furthermore, by the gate driver 113 and the data driver 114 receiving the pulse signal generated by the timing control unit 140, an image according to the signal transmitted from the picture signal control unit 120 is displayed on the display panel 112.

A polarization control filter (described later) further circularly polarizing light that has transmitted through the polarizing plates is included on the image display unit 110. Light incident on the polarization control filter is emitted by being circularly polarized in a predetermined direction by passing through the polarization control filter. The viewer can stereoscopically view the image displayed on the image display unit 110 by viewing the light circularly polarized by the polarization control filter through a right eye image transmission unit 212 and a left eye image transmission unit 214 of the polarization glasses 200.

On the other hand, in a case where an ordinary image is displayed on the image display unit 110, the viewer can perceive the image as an ordinary image by viewing the light emitted from the image display unit 110 as is without wearing the polarization glasses 200.

Here, while the display device 100 has been shown as a television set in FIG. 1, the display device 100 may also be, for example, a monitor used by being connected to a personal computer or another electronic apparatus, a mobile game console, a mobile phone, or a mobile music reproduction device.

Figure 2:
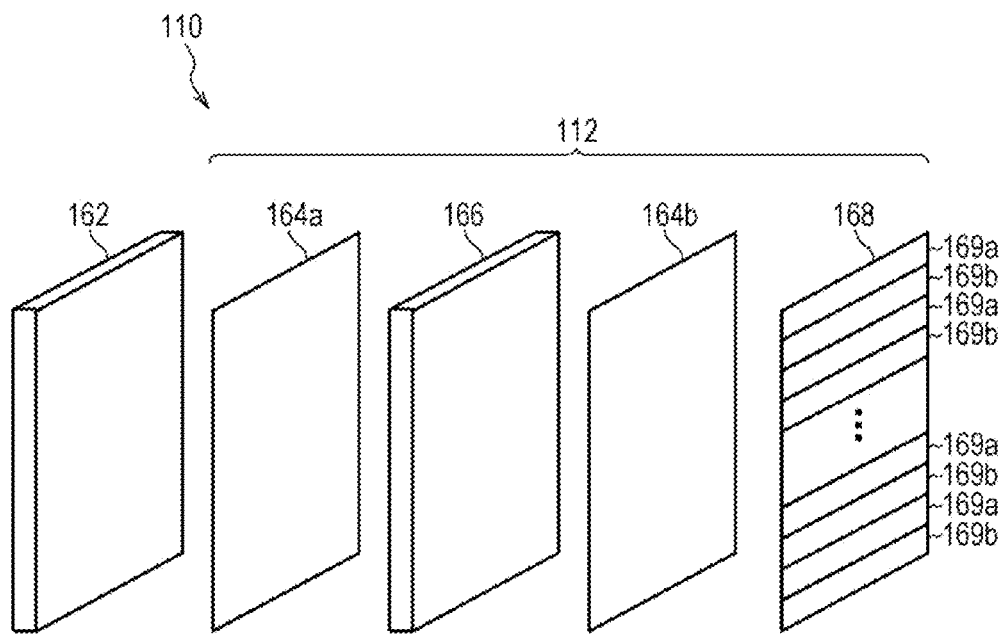
FIG. 2 is a view illustrating the configuration of an image display unit 110 in detail.

Details of the configuration of the image display unit 110 are illustrated in FIG. 2. The image display unit 110 illustrated in the drawing includes the light source 162, polarizing plates 164a and 164b, a liquid crystal panel 166, and a polarization control filter 168. Of the above, the display panel 112 illustrated in FIG. 1 is configured by the polarizing plates 164a and 164b, the liquid crystal panel 166, and the polarization control filter 168.

The light source 162 is provided furthest to the back of the image display unit 110 when viewed from the viewer side. When displaying an image on the image display unit 110, unpolarized white light is emitted from the light source 162 to the display panel 112 placed on the viewer side. A light emitting diode, a cold cathode tube, or the like can be used as the light source 162. While the light source 162 illustrated in the drawing is a surface light source, the gist of the present invention is not limited to the form of a specific light source. For example, light may be emitted onto the display panel 112 by placing a light source in the surroundings portion of the display panel 112 and scattering the light from the light source through a diffusing panel or the like. Further, for example, a point light source and a condensing lens may be combined instead of a surface light source.

The polarizing plate 164a is placed between the light source 162 and the liquid crystal panel 166. The polarizing plate 164a includes a transmission axis and an absorption axis orthogonal to the transmission axis. When unpolarized white light emitted from the light source 162 is incident on the polarizing plate 164a, the polarizing plate 164a transmits components with a polarization axis parallel to the transmission axis direction out of the unpolarized white light, and blocks light with a polarization axis parallel to the absorption axis direction. Light that has transmitted through the polarizing plate 164a is emitted to the liquid crystal panel 166.

The liquid crystal panel 166 is configured by liquid crystal molecules with a predetermined orientation state being enclosed between two transparent plates such as glass substrates. In a case where the driving method of the display panel 112 is the TN method, liquid crystals oriented twisted by a predetermined angle (for example, 90 degrees) are enclosed between the two transparent plates. Here, in a case where the driving method of the display panel 112 is the VA method, the liquid crystal molecules are vertically oriented with respect to the electrodes. The liquid crystal panel 166 configures a TFT (Thin Film Transistor) type liquid crystal display panel. Light incident on the liquid crystal panel 166 is emitted from the liquid crystal panel 166 with the incident light shifted by 90 degrees in a state in which a voltage has not been applied to the liquid crystal panel 166. On the other hand, in a state in which a voltage has been applied to the liquid crystal panel 166, since the twist of the liquid crystals is eliminated, the incident light is emitted from the liquid crystal panel 166 with the same polarization state.

The liquid crystal panel 166 is formed of a plurality of pixels respectively arranged in the horizontal direction and the vertical direction, and an image is displayed by driving each pixel by applying a pulse signal from the gate driver 113 and the data driver 114. When displaying an image to be perceived by the viewer as a stereoscopic three-dimensional image on the image display unit 110, the liquid crystal panel 166 alternately displays the right eye image and the left eye image with one row of pixels at a time. In the present embodiment, the image display unit 110 is configured to respectively display the right eye image on odd rows of the liquid crystal panel 166 and the left eye image on even rows.

The polarizing plate 164b is placed in front of the liquid crystal panel 166 when viewed from the viewer side. The polarizing plate 164b includes a transmission axis and an absorption axis orthogonal to the transmission axis. Here, the transmission axis of the polarizing plate 164b is orthogonal to the transmission axis of the polarizing plate 164a, and the absorption axis of the polarizing plate 164b is orthogonal to the absorption axis of the polarizing plate 164a. When light that has transmitted through the liquid crystal panel 166 is incident on the polarizing plate 164b, the polarizing plate 164b transmits components with a polarization axis parallel to the transmission axis direction out of the light that has been transmitted through the liquid crystal panel 166, and blocks light with a polarization axis parallel to the absorption axis direction. Light that has transmitted through the polarizing plate 164b is emitted to the polarization control filter 168.

The polarization control filter 168 is paced in front of the polarizing plate 164b when viewed from the viewer side. The polarization control filter 168 has a polarization region 169a and a polarization region 169b respectively including a ¼ wavelength plate arranged in order to circularly polarize the light that has transmitted through the polarizing plate 164b to either right circularly polarized light or left circularly polarized light. The respective optical axes of the polarization region 169a and the polarization region 169b are orthogonal to each other. For example, light of the right eye images R1, R2, R3, . . . is right circularly polarized in the polarization region 169a, and light of the left eye images L1, L2, L3, . . . is left circularly polarized in the polarization region 169b.

When displaying an image to be perceived by the viewer as a stereoscopic three-dimensional picture on the image display unit 110, as described above, the right eye image and the left eye image are alternately displayed on the liquid crystal panel 166 one row of pixels at a time. Specifically, the liquid crystal panel 166 is configured so that the right eye image and the left eye image are respectively displayed on odd rows and even rows of the liquid crystal panel 166. Therefore, the polarization control filter 168 is provided in front (viewer side) of the polarizing plate 164b so that the polarization region 169a is positioned to correspond to odd rows of the liquid crystal panel 166 and the polarization region 169b is positioned to correspond to even rows of the liquid crystal panel 166.

The viewer can perceive the image displayed on the image display unit 110 as a stereoscopic three-dimensional image by viewing the light circularly polarized by the polarization control filter 168 through the polarization glasses 200.

As already described in the [Background Art] section, with a display device using a polarization control filter, there is a problem in that the division of light is insufficient at a boundary at which the polarization state of the polarization control filter changes when displaying a three-dimensional image. If the division of light is insufficient, a phenomenon in which a portion of the right eye image and a portion of the left eye image respectively leak into the left eye and the right eye, that is, crosstalk, is generated. While a method of arranging a black matrix at the boundary portion at which the polarization state of the filter changes in order to suppress the generation of crosstalk is known, there is a problem in that the brightness decreases by an amount corresponding to the blocking by the black matrix when an ordinary two-dimensional picture is displayed on the screen.

Therefore, in the present specification, a method of suppressing crosstalk without using a black matrix is proposed by realizing the division of light at a boundary at which the polarization state of the polarization control filter changes by providing a row of pixels that are constantly displayed in black when a three-dimensional image is displayed and arranging a boundary portion at which the polarization state of the polarization control filter changes to match the row of pixels displayed in black. Such a method can be applied to both a horizontal arrangement structure in which the liquid crystal cells of each horizontal line are arranged with the same color and a vertical arrangement structure in which the liquid crystal cells of each horizontal line are arranged in different colors. Here, with a horizontal arrangement structure, the number of data lines can be reduced by ⅓ compared to a vertical arrangement structure in which the liquid crystal cells of each horizontal line are arranged in different colors, and the manufacturing cost is low. Several configuration examples of the display panel 112 suppressing crosstalk without using a black matrix will be described in detail below.

Figure 3:
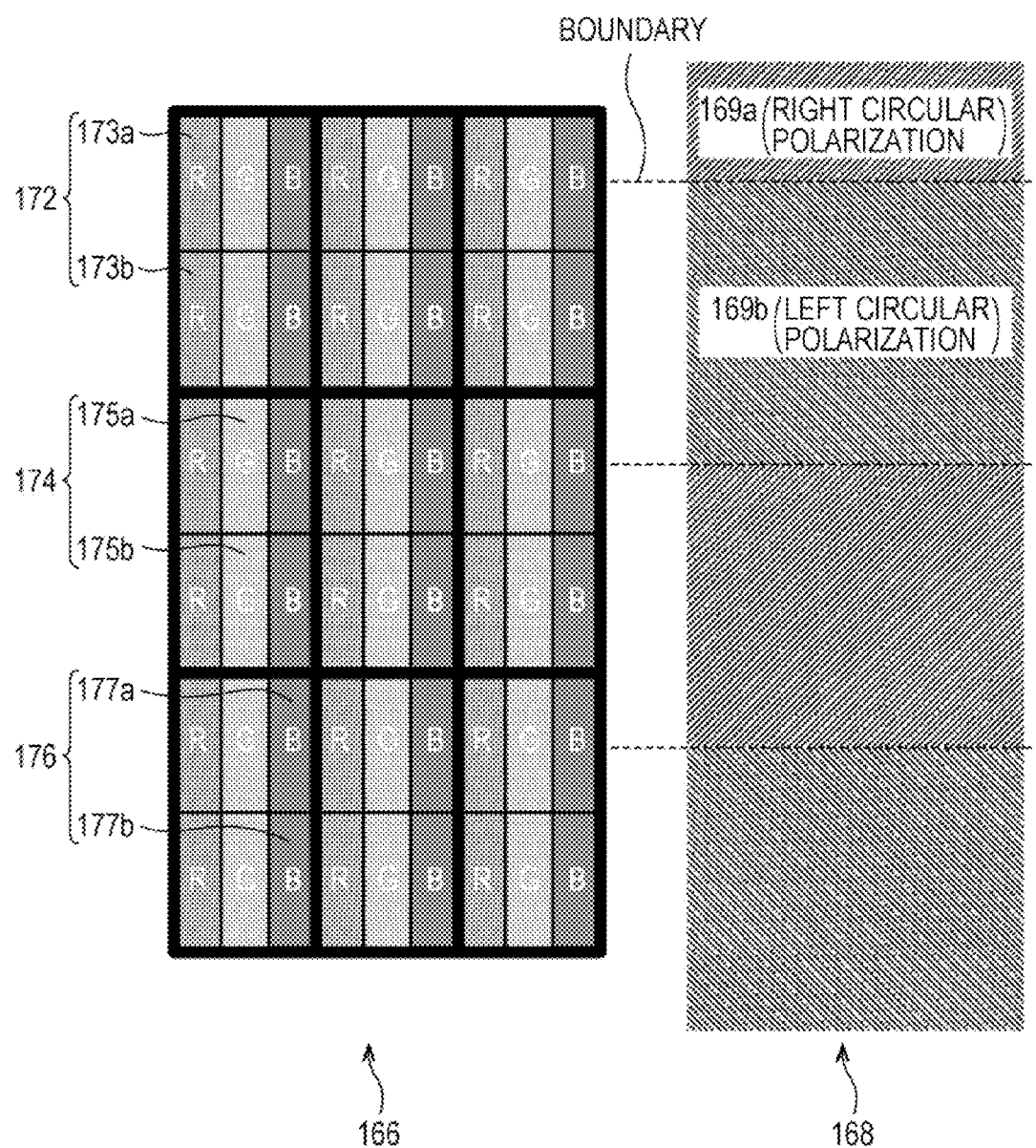
FIG. 3 is a view illustrating a configuration example of a liquid crystal panel realizing the division of light at a boundary at which the polarization state of a polarization control filter changes without using a black matrix (in a case where an ordinary two-dimensional image is displayed).

A configuration example of a liquid crystal panel realizing the division of light at a boundary at which the polarization state of the polarization control filter changes without using a black matrix is illustrated in FIG. 3.

A unit pixel of the liquid crystal panel 166 illustrated in the drawing is configured by three columns of liquid crystal cells, and red liquid crystal cells 172 emitting red, green liquid crystal cells 174 emitting green, and blue liquid crystal cells 176 emitting blue are arranged in the horizontal direction. Furthermore, the liquid crystal panel 166 has a vertical arrangement structure in which a plurality of pixels are repeatedly arranged in the horizontal direction and the vertical direction, the liquid crystal cells of each horizontal line are arranged in different colors.

Furthermore, the red liquid crystal cells 172 are divided in two into sub cells 173a and 173b with approximately the same size in the vertical direction, the green liquid crystal cells 174 are divided in two into sub cells 175a and 175b with approximately the same size in the vertical direction, and the blue liquid crystal cells 176 are divided in two into sub cells 177a and 177b with approximately the same size in the vertical direction.

Each sub cell 173a, 175a, and 177a has the same length in the vertical direction, and the sub pixels 173a, 175a, and 177a are repeatedly arranged in the horizontal direction in such an order. Further, each sub pixel 173b, 175b, and 177b also has the same length in the vertical direction, and the sub pixels 173b, 175b, and 177b are repeatedly arranged in the horizontal direction in such an order.

Further, the polarization control filter 168 is also illustrated in FIG. 3 along with the liquid crystal panel 166. While the liquid crystal panel 166 and the polarization control filter 168 have been drawn horizontally next to each other for convenience of description, the polarization control filter 168 is placed on the front face (viewer side) of the liquid crystal panel 166 in an actual display device 100.

The polarization control filter 168 is configured by alternately arranging the polarization region 169a circularly polarizing in a right circular polarization direction with respectively a width of one row of pixels and the polarization region 169b circularly polarizing in the left circular polarization direction, in the vertical direction. In the drawing, the difference in the direction of the circular polarization of each region is represented by diagonal lines. As illustrated in the drawing, the polarization control filter 168 is placed so that the boundary between the polarization region 169a and the polarization region 169b is within the range of each sub cell 173a, 175a, and 177a.

Figure 17:
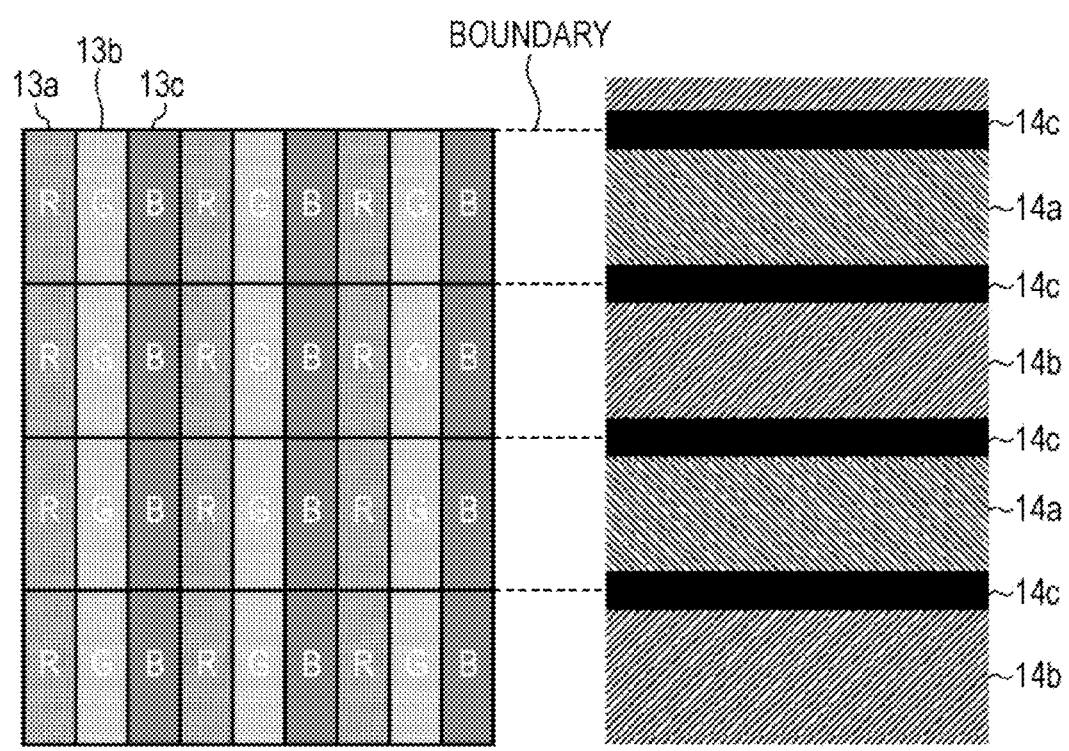
FIG. 17 is a view illustrating an example of a polarization control filter 14 including a black matrix 14c.

In a case where an ordinary two-dimensional image is displayed on the display device 100, as illustrated in FIG. 3, an image is displayed on the liquid crystal panel 166 by using two sub cells together in all liquid crystal cells. In a case where an ordinary image is displayed on the display device 100, it can be seen that there is no black matrix. By displaying an ordinary image on the display device 100 in such a manner, an image with greater brightness than in a case where the black matrix 14c is used in the polarization control filter (refer to FIG. 17) can be displayed on the image display unit 110.

Figure 4:
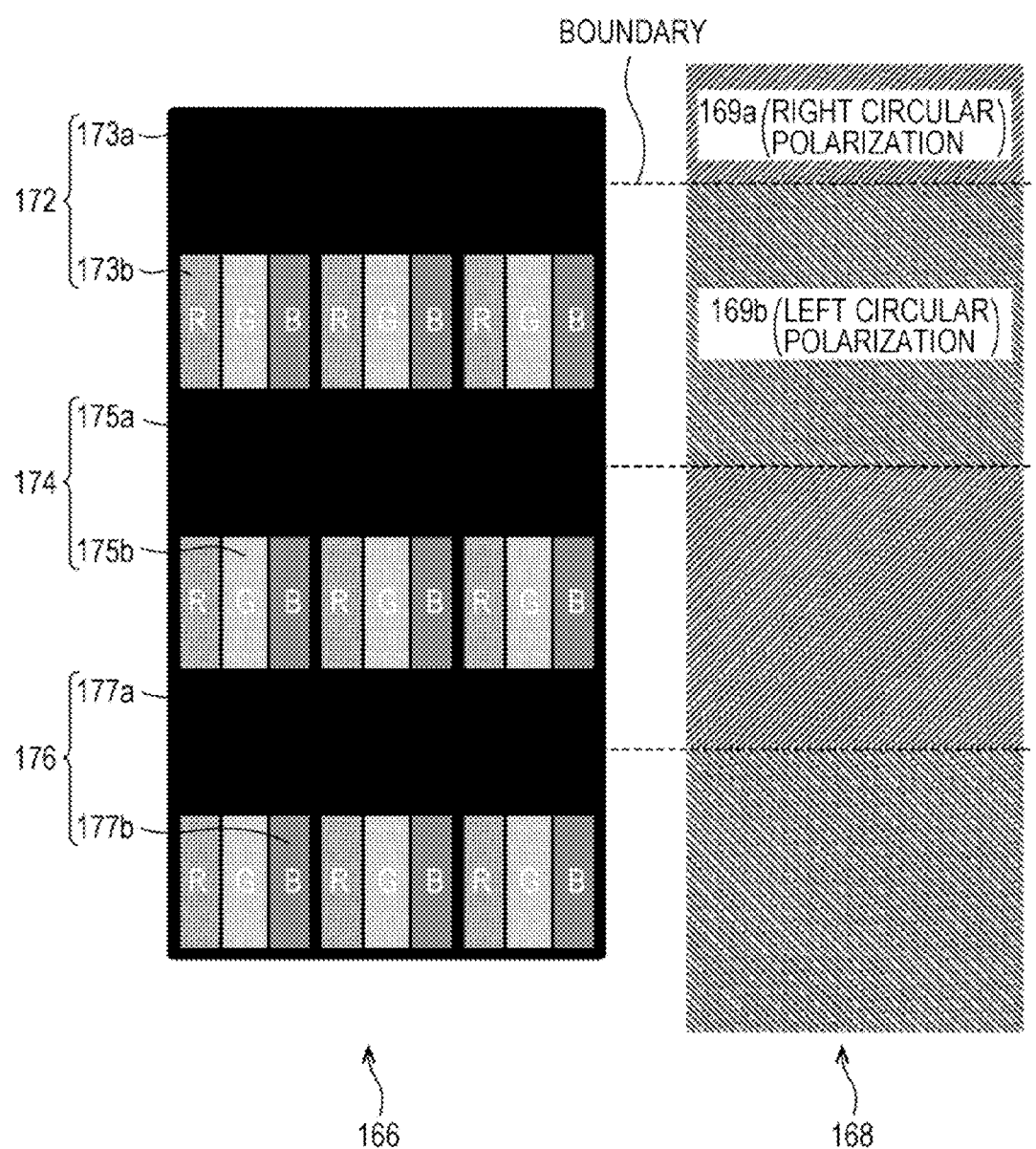
FIG. 4 is a view illustrating a configuration example of the liquid crystal panel realizing the division of light at a boundary at which the polarization state of the polarization control filter changes without using a black matrix (in a case where a three-dimensional image is displayed).

On the other hand, in a case where an image to be perceived by the viewer as a stereoscopic image (three-dimensional image) is displayed on the display device 100, as illustrated in FIG. 4, black is displayed by the sub cells 173a, 175a, and 177a positioned at a boundary between the polarization region 169a and the polarization region 169b of the polarization control filter 168, and the regular image is displayed by the other sub cells 173b, 175b, and 177b.

The display of each sub cell can be controlled by the picture signal control unit 120. When displaying a three-dimensional image on the image display unit 110 as described above, a signal process is executed by the picture signal control unit 120 so that the right eye image is displayed on odd rows of the liquid crystal panel 166 and the left eye image is displayed on even rows. Furthermore, the picture signal control unit 120 may transmit a signal from the picture signal control unit 120 to the timing control unit 140 so that black is displayed on rows of the sub cells 173a, 175a, and 177a of each pixel. Displaying black on the sub cells is realized by inputting a brightness signal of 0 gradations.

The sub cells 173a, 175a, and 177a displaying black act as the black matrix of the polarization control filter 168. Therefore, in a case where an image to be perceived by the viewer as a stereoscopic image is displayed, the generation of crosstalk can be suppressed by displaying black on the sub cells 173a, 175a, and 177a.

Here, in a case where a three-dimensional image is displayed, there are sub cells that are constantly displayed in black. Therefore, in a case where a three-dimensional image is displayed, as various parameters relating to image quality correction on an image signal supplied to each sub cell, that is, parameters relating to image quality such as gamma correction, ACC (Accurate Color Capture) processing, and overdrive, different parameters to a case where a two-dimensional image is displayed can be used. With gamma correction as an example, the parameters are changed so that gamma correction is applied appropriately in a state in which the sub pixels 173a, 175a, and 177a are excluded in a case where a three-dimensional image is displayed and so that gamma correction is applied appropriately in a state in which all sub pixels are included in a case where a two-dimensional image is displayed. In so doing, the image quality of a three-dimensional image displayed on the image display unit 110 can be increased by correcting the image quality of the image displayed on the image display unit 110 through parameters suited to the display of a three-dimensional image, which are different to a case where a two-dimensional image is displayed.

Figure 5:
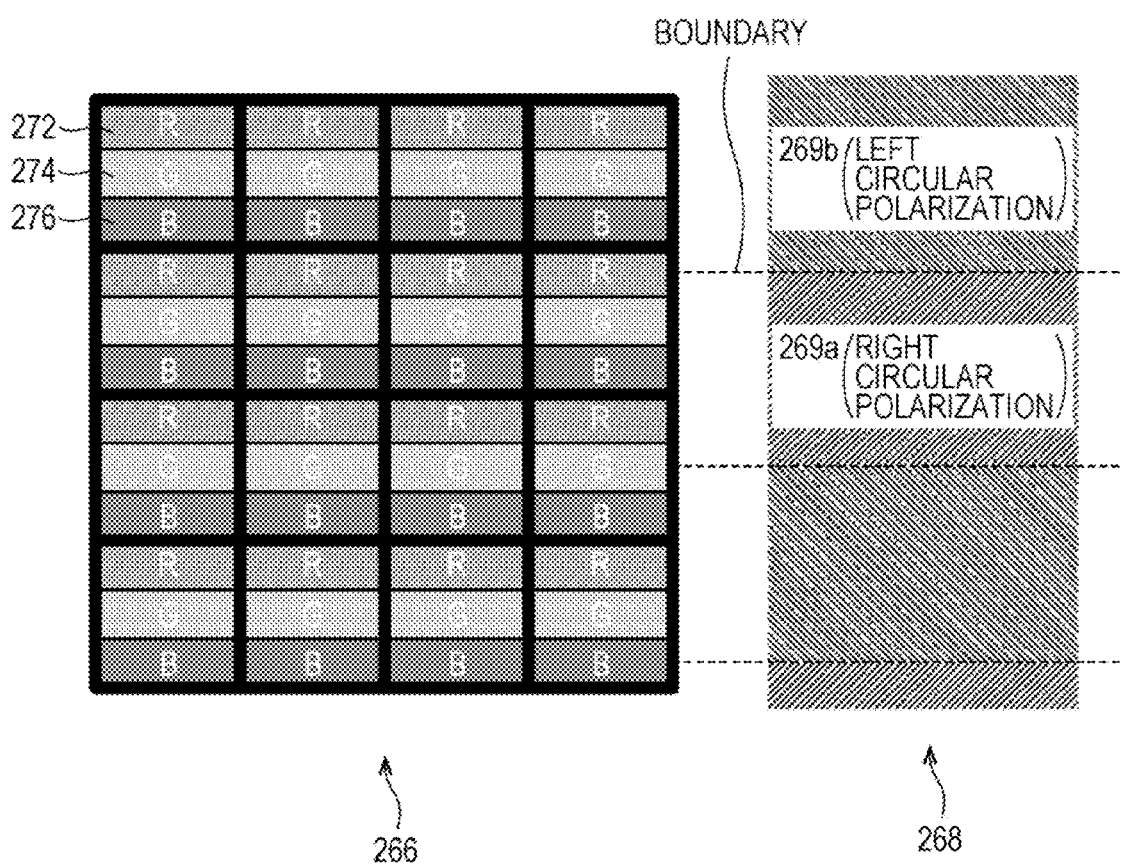
FIG. 5 is a view illustrating another configuration example of the liquid crystal panel realizing the division of light at a boundary at which the polarization state of the polarization control filter changes without using a black matrix (in a case where an ordinary two-dimensional image is displayed).

Another configuration example of the liquid crystal panel realizing the division of light at a boundary at which the polarization state of the polarization control filter changes without using a black matrix is illustrated in FIG. 5.

A unit pixel of a liquid crystal panel 266 illustrated in the drawing is configured by three rows of liquid crystal cells, and the three colors of red liquid crystal cells 272, green liquid crystal cells 274, and blue liquid crystal cells 276 are arranged in the vertical direction. Furthermore, the liquid crystal panel 266 has a horizontal arrangement structure in which a plurality of pixels are repeatedly arranged in the horizontal direction and the vertical direction, and the liquid crystal cells of each horizontal line are arranged in the same color. A horizontal arrangement structure can reduce the number of data lines to ⅓ of a vertical arrangement structure in which the liquid crystal cells of each horizontal line are arranged in different colors, lowering the manufacturing cost.

Further, a polarization control filter 268 is also illustrated in FIG. 5 along with the liquid crystal panel 266. While the liquid crystal panel 266 and the polarization control filter 268 have been drawn horizontally next to each other for convenience of description, the polarization control filter 268 is placed on the front face (viewer side) of the liquid crystal panel 266 in an actual display device 100.

The polarization control filter 268 is configured by alternately arranging a polarization region 269a circularly polarizing in the right circular polarization direction and a polarization region 269b circularly polarizing in the left circular polarization direction, in the vertical direction. In the drawing, the difference in the direction of circular polarization of each region is represented by diagonal lines. However, unlike in the example illustrated in FIG. 3, both polarization regions 269a and 269b have widths in which one liquid crystal cell is added to the width of one row of pixels. Furthermore, the polarization control filter 268 is placed so that the boundary between the polarization region 269a and the polarization region 269b is within the ranges of the red liquid crystal cells 272, the green liquid crystal cells 274, and the blue liquid crystal cells 276 in order in the vertical direction.

In a case where an ordinary two-dimensional image is displayed on the display device 100, as illustrated in FIG. 5, the image is displayed on the liquid crystal panel 266 on all of the liquid crystal cells 272, 274, and 276. It can be seen that there is no black matrix in a case where an ordinary image is displayed on the display device 100. By displaying an ordinary image on the display device 100 in such a manner, an image with greater brightness than in a case where the black matrix 14c is used in the polarization control filter (refer to FIG. 17) can be displayed on the image display unit 110.

Figure 6:
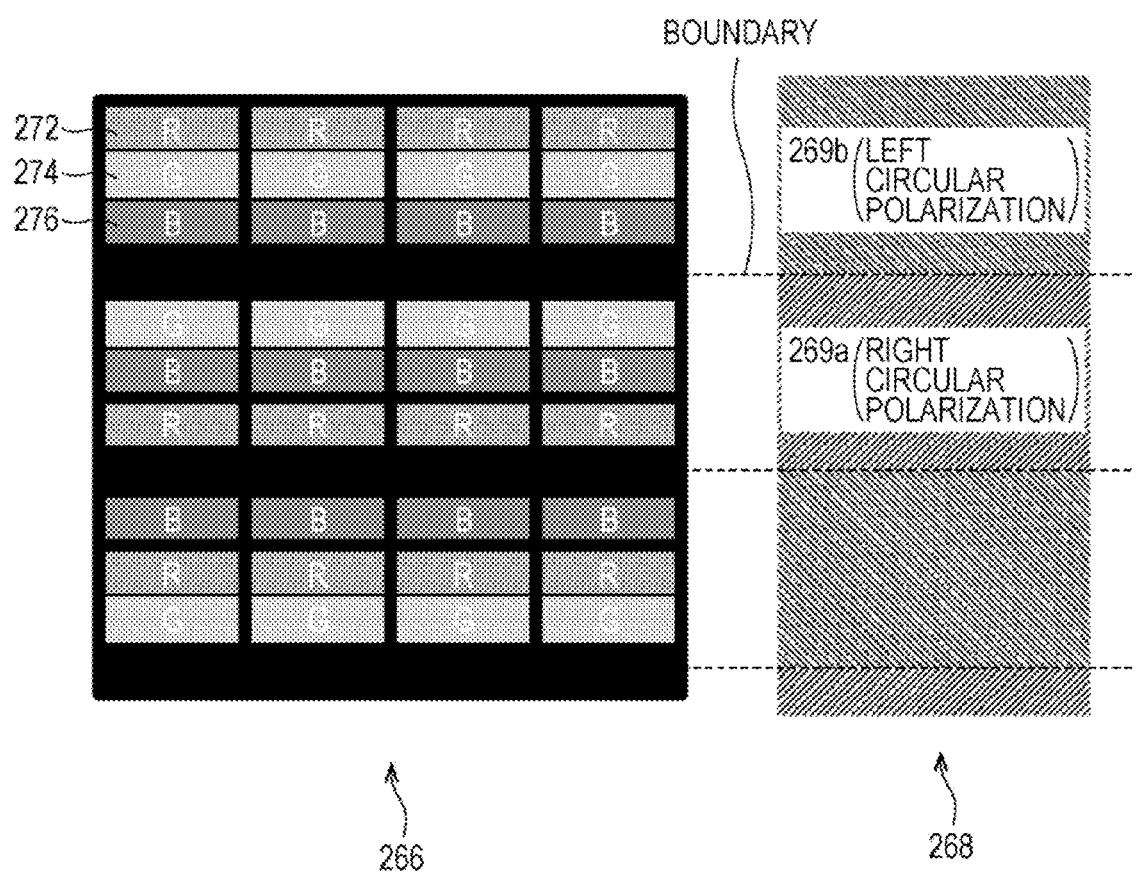
FIG. 6 is a view illustrating another configuration example of the liquid crystal panel realizing the division of light at a boundary at which the polarization state of the polarization control filter changes without using a black matrix (in a case where a three-dimensional image is displayed).

On the other hand, in a case where an image to be perceived by the viewer as a stereoscopic image (three-dimensional image) is displayed on the display device 100, as illustrated in FIG. 6, black is displayed by the red liquid crystal cells 272, the green liquid crystal cells 274, and the blue liquid crystal cells 276 positioned at a boundary between the polarization region 269a and the polarization region 269b of the polarization control filter 268, and the regular image is displayed by the other red liquid crystal cells 272, green liquid crystal cells 274, and blue liquid crystal cells 276 away from the boundary between the polarization region 269a and the polarization region 269b of the polarization control filter 268.

The display of each liquid crystal cell can be controlled by the picture signal control unit 120. When displaying a three-dimensional image on the image display unit 110 as described above, a signal process is executed by the picture signal control unit 120 so that the right eye image is displayed on odd rows of the liquid crystal panel 266 and the left eye image is displayed on even rows. Furthermore, the picture signal control unit 120 may transmit a signal from the picture signal control unit 120 to the timing control unit 140 so that black is displayed on the liquid crystal cells positioned at the boundary between the polarization region 269a and the polarization region 269b of the polarization control filter 268. Displaying black on the liquid crystal cells is realized by inputting a brightness signal of 0 gradations.

The liquid crystal cells positioned at the boundary between the polarization region 269a and the polarization region 269b of the polarization control filter 268 act as the black matrix of the polarization control filter 268 by being displayed in black. Therefore, in a case where an image to be perceived by the viewer as a stereoscopic image is displayed, the generation of crosstalk can be suppressed by displaying black on the liquid crystal cells positioned at the boundary between the polarization region 269a and the polarization region 269b of the polarization control filter 268.

Further, when displaying a three-dimensional image, by displaying black on liquid crystal cells positioned at the boundary between the polarization region 269a and the polarization region 269b of the polarization control filter 268 and displaying the regular image on the other liquid crystal cells away from the boundary between the polarization region 269a and the polarization region 269b, as illustrated in FIG. 6, red, green, blue, black, red, green, blue, black, . . . are arranged in order in the vertical direction. That is, since the color of the liquid crystal cells to be displayed in black changes from red, green, blue, . . . in order, the ratio of loss due to the black display is even between the color components (that is, the constituent ratios of red, green, and yellow are the same as when a two-dimensional image is displayed), and crosstalk can be suppressed while limiting a deterioration in the resolution to a minimum without causing a deviation in colors during three-dimensional display.

Figure 7:
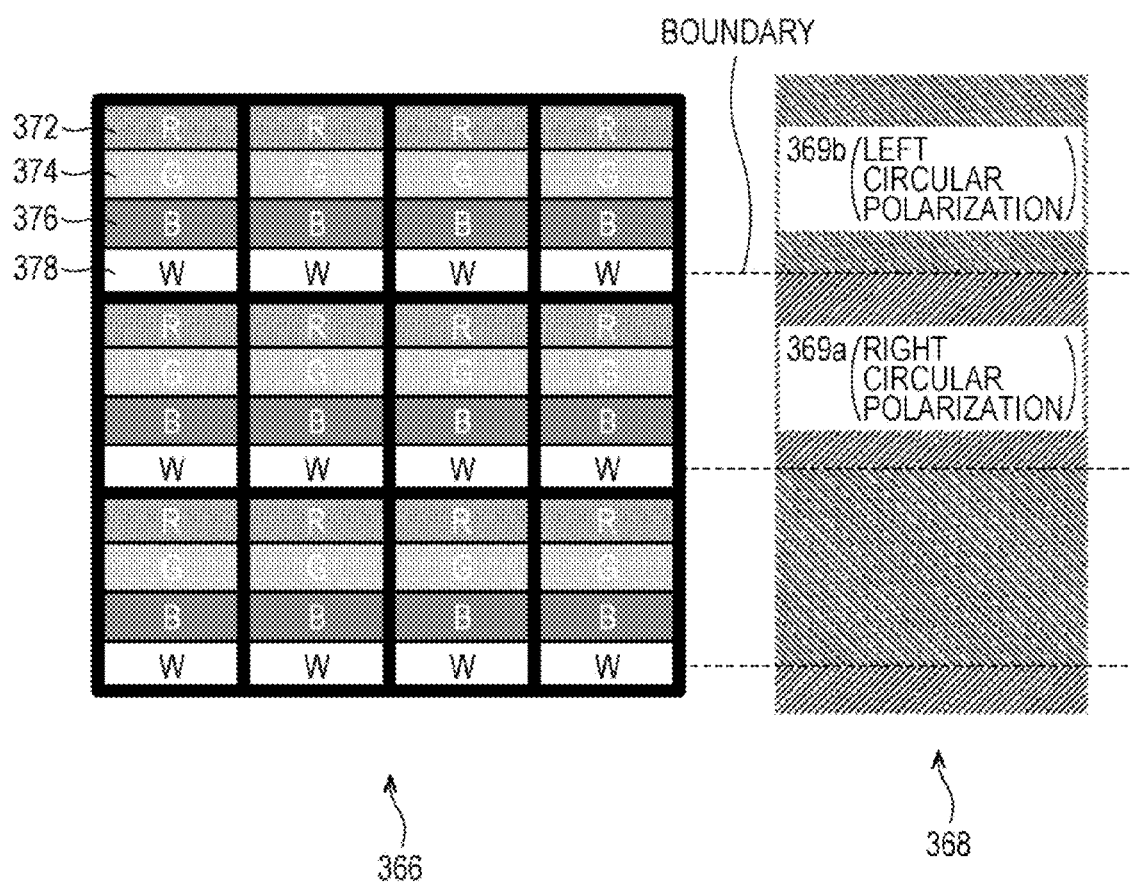
FIG. 7 is a view illustrating still another configuration example of the liquid crystal panel realizing the division of light at a boundary at which the polarization state of the polarization control filter changes without using a black matrix (in a case where an ordinary two-dimensional image is displayed).

Still another configuration example of the liquid crystal panel realizing the division of light at a boundary at which the polarization state of the polarization control filter changes without using a black matrix is illustrated in FIG. 7.

A unit pixel of a liquid crystal panel 366 illustrated in the drawing is configured by four rows of liquid crystal cells, and the four colors of red liquid crystal cells 372, green liquid crystal cells 374, blue liquid crystal cells 376, and liquid crystal cells 378 of a color other than red, green, and blue are arranged in order in the vertical direction. Here, description will be given with the liquid crystal cells 378 being white (W). The brightness of the displayed image improves by adding white liquid crystal cells. Furthermore, the liquid crystal panel 366 has a horizontal arrangement structure in which a plurality of pixels are repeatedly arranged in the horizontal direction and the vertical direction, and the liquid crystal cells of each horizontal line are arranged in the same color.

Further, a polarization control filter 368 is also illustrated in FIG. 7 along with the liquid crystal panel 366. While the liquid crystal panel 366 and the polarization control filter 368 have been drawn horizontally next to each other for convenience of description, the polarization control filter 368 is placed on the front face (viewer side) of the liquid crystal panel 366 in an actual display device 100.

The polarization control filter 368 is configured by alternately arranging a polarization region 369a circularly polarizing in the right circular polarization direction and a polarization region 369b circularly polarizing in the left circular polarization direction, in the vertical direction. In the drawing, the difference in the direction of circular polarization of each region is represented by diagonal lines. Similarly to the example illustrated in FIG. 5, both polarization regions 369a and 369b have widths in which one liquid crystal cell is added to the width of one row of pixels. Furthermore, the polarization control filter 368 is placed so that the boundary between the polarization region 369a and the polarization region 369b is within the range of the white liquid crystal cells 378.

In a case where an ordinary two-dimensional image is displayed on the display device 100, as illustrated in FIG. 5, the image is displayed on the liquid crystal panel 366 on all of the liquid crystal cells 372, 374, 376, and 378. It can be seen that there is no black matrix in a case where an ordinary image is displayed on the display device 100. By displaying an ordinary image on the display device 100 in such a manner, an image with greater brightness than in a case where the black matrix 14c is used in the polarization control filter (refer to FIG. 17) can be displayed on the image display unit 110.

Figure 8:
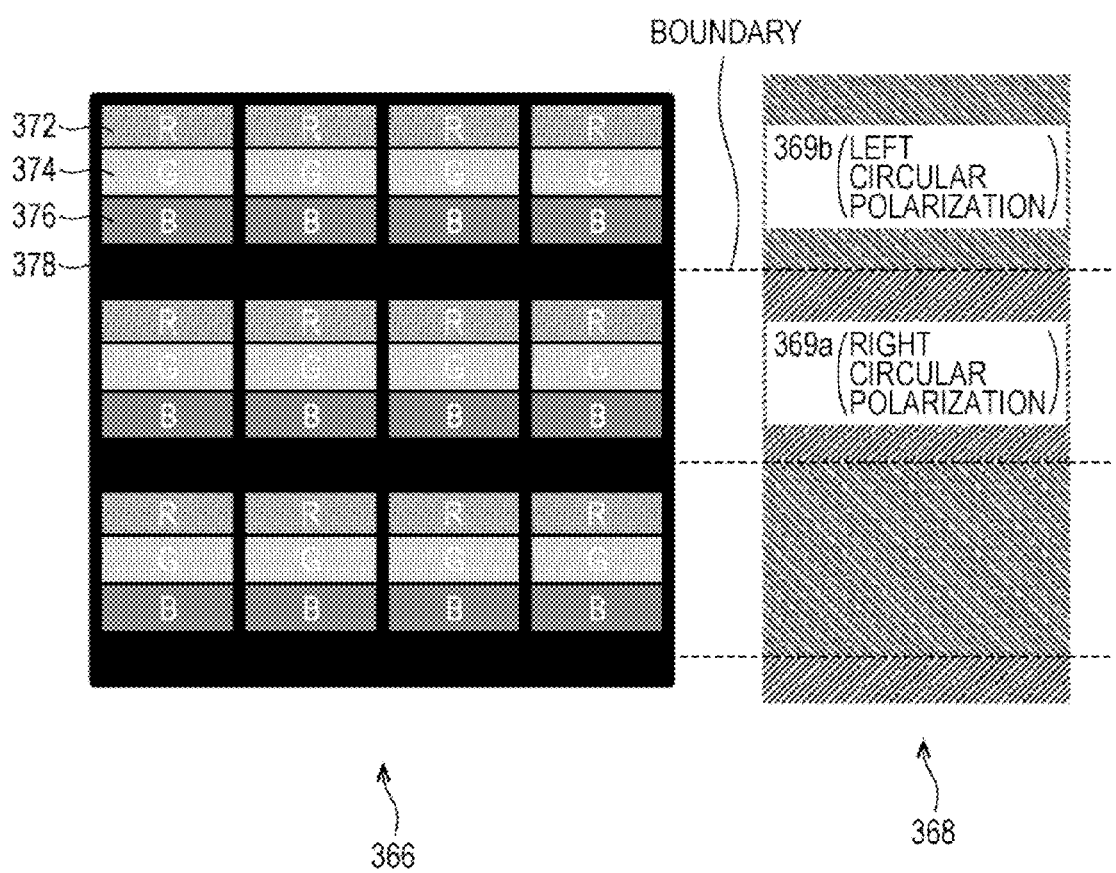
FIG. 8 is a view illustrating still another configuration example of the liquid crystal panel realizing the division of light at a boundary at which the polarization state of the polarization control filter changes without using a black matrix (in a case where a three-dimensional image is displayed).

On the other hand, in a case where an image to be perceived by the viewer as a stereoscopic image (three-dimensional image) is displayed on the display device 100, as illustrated in FIG. 8, black is displayed by the white liquid crystal cells 378 positioned at a boundary between the polarization region 369a and the polarization region 369b of the polarization control filter 368, and the regular image is displayed by the other red liquid crystal cells 372, green liquid crystal cells 374, and blue liquid crystal cells 376 away from the boundary between the polarization region 369a and the polarization region 369b of the polarization control filter 368.

The display of each liquid crystal cell can be controlled by the picture signal control unit 120. When displaying a three-dimensional image on the image display unit 110 as described above, a signal process is executed by the picture signal control unit 120 so that the right eye image is displayed on odd rows of the liquid crystal panel 366 and the left eye image is displayed on even rows. Furthermore, the picture signal control unit 120 may transmit a signal from the picture signal control unit 120 to the timing control unit 140 so that black is displayed on the white liquid crystal cells 378 positioned at the boundary between the polarization region 369a and the polarization region 369b of the polarization control filter 368. Displaying black on the white liquid crystal cells 378 is realized by inputting a brightness signal of 0 gradations.

The white liquid crystal cells 378 positioned at the boundary between the polarization region 369a and the polarization region 369b of the polarization control filter 368 act as the black matrix of the polarization control filter 368 by being displayed in black. Therefore, in a case where an image to be perceived by the viewer as a stereoscopic image is displayed, the generation of crosstalk can be suppressed by displaying black on the white liquid crystal cells 378.

According to the example illustrated in FIGS. 7 and 8, unlike in the example illustrated in FIGS. 5 and 6, even when a three-dimensional image is displayed, the regular image is displayed from all of the red liquid crystal cells 372, the green liquid crystal cells 374, and the blue liquid crystal cells 376 for each pixel. Therefore, the crosstalk can be improved without losing the color reproduction range or resolution when displaying a three-dimensional image.

Figure 9:
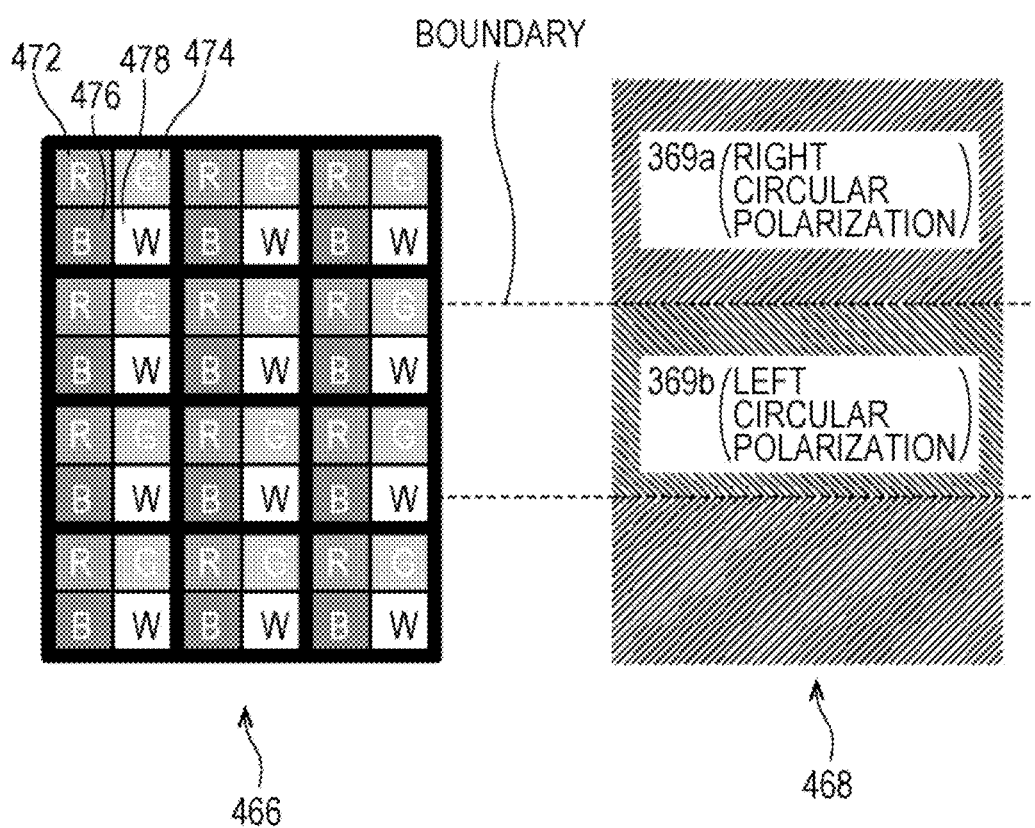
FIG. 9 is a view illustrating still another configuration example of the liquid crystal panel realizing the division of light at a boundary at which the polarization state of the polarization control filter changes without using a black matrix (in a case where an ordinary two-dimensional image is displayed).

Still another configuration example of the liquid crystal panel realizing the division of light at a boundary at which the polarization state of the polarization control filter changes without using a black matrix is illustrated in FIG. 9.

While a unit pixel of a liquid crystal panel 466 illustrated in the drawing includes the four colors of red liquid crystal cells 472, green liquid crystal cells 474, blue liquid crystal cells 476, and liquid crystal cells 478 of another color in a similar manner to the example illustrated in FIG. 7, there is a difference in that a unit pixel is configured by two rows and two columns of liquid crystal cells. Here, the liquid crystal cells 478 are described as being white (W). In the example illustrated in the drawing, the red liquid crystal cells 472, the green liquid crystal cells 474, the blue liquid crystal cells 476, and the white liquid crystal cells 478 are respectively next to each other in the horizontal direction. Therefore, a row of liquid crystal cells in which the red liquid crystal cells 472 and the green liquid crystal cells 474 are alternately arranged and a row of liquid crystals in which the blue liquid crystal cells 476 and the white liquid crystal cells 478 are alternately arranged are alternately arranged in the vertical direction in the horizontal direction of the liquid crystal panel 466. Below, for convenience of description, each liquid crystal cell is a square of the same size, and a unit pixel is a square with double the length of a liquid crystal cell on one side.

Further, a polarization control filter 468 is also illustrated in FIG. 9 along with the liquid crystal panel 466. While the liquid crystal panel 466 and the polarization control filter 468 have been drawn horizontally next to each other for convenience of description, the polarization control filter 468 is placed on the front face (viewer side) of the liquid crystal panel 466 in an actual display device 100.

The polarization control filter 468 is configured by alternately arranging a polarization region 469a circularly polarizing in the right circular polarization direction and a polarization region 469b circularly polarizing in the left circular polarization direction, in the vertical direction. In the drawing, the difference in the direction of circular polarization of each region is represented by diagonal lines. The polarization regions 469a and 469b both have widths in which one liquid crystal cell is added to the width of one row of pixels. Furthermore, the polarization control filter 468 is placed so that a boundary between the polarization region 469a and the polarization region 469b is alternately in order in the vertical direction within the range of a row of liquid crystal cells in which the red liquid crystal cells 472 and the green liquid crystal cells 474 are alternately arranged and a range of a row of liquid crystal cells in which the blue liquid crystal cells 476 and the white liquid crystal cells 478 are alternately arranged. In other words, a boundary between the polarization region 469a and the polarization region 469b is arranged in the vertical direction with two rows of liquid crystal cells therebetween.

In a case where an ordinary two-dimensional image is displayed on the display device 100, as illustrated in FIG. 9, the image is displayed on the liquid crystal panel 466 on all of the liquid crystal cells 472, 474, 476, and 478. It can be seen that there is no black matrix in a case where an ordinary image is displayed on the display device 100. By displaying an ordinary image on the display device 100 in such a manner, an image with greater brightness than in a case where the black matrix 14c is used in the polarization control filter (refer to FIG. 17) can be displayed on the image display unit 110.

Figure 10:
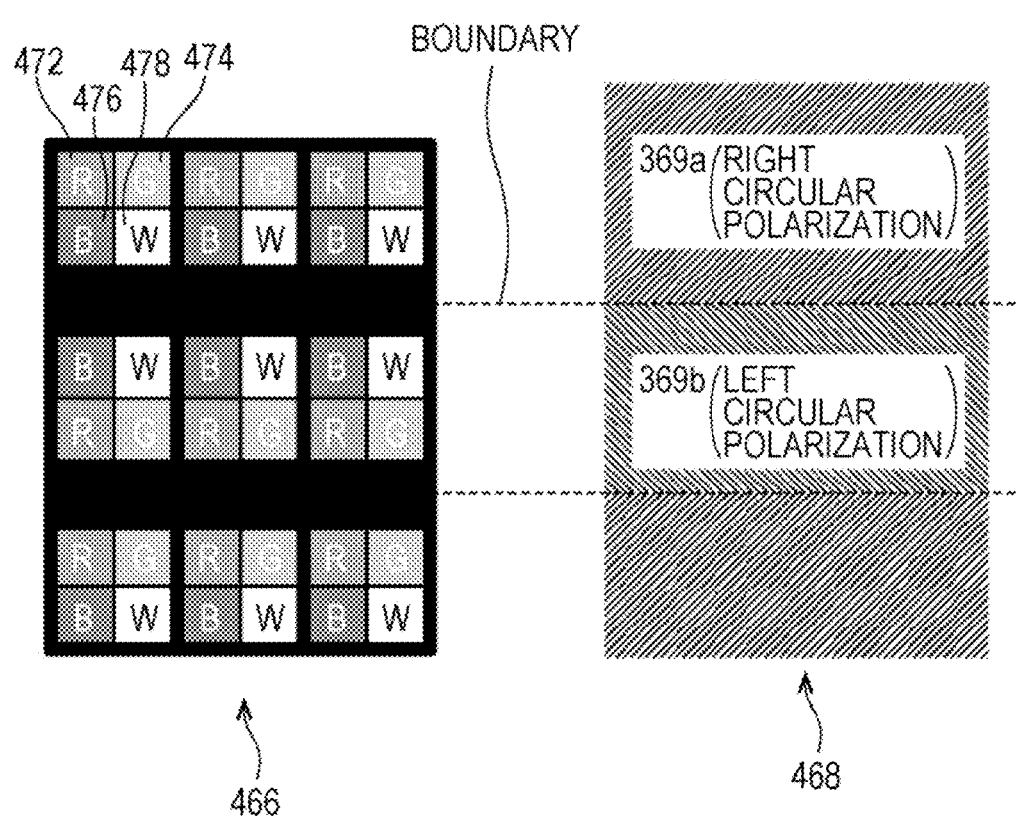
FIG. 10 is a view illustrating still another configuration example of the liquid crystal panel realizing the division of light at a boundary at which the polarization state of the polarization control filter changes without using a black matrix (in a case where a three-dimensional image is displayed).

On the other hand, in a case where an image to be perceived by the viewer as a stereoscopic image (three-dimensional image) is displayed on the display device 100, as illustrated in FIG. 10, black is displayed by a row of liquid crystal cells positioned at a boundary between the polarization region 469a and the polarization region 469b of the polarization control filter 468, and the regular image is displayed by other rows of liquid crystal cells away from the boundary between the polarization region 469a and the polarization region 469b of the polarization control filter 468. As can be seen in FIG. 10, a row of liquid crystal cells in which the red liquid crystal cells 472 and the green liquid crystal cells 474 are alternately arranged and a row of liquid crystal cells in which the blue liquid crystal cells 476 and the white liquid crystal cells 478 are alternately arranged are displayed in black with respectively two rows therebetween.

The display of each liquid crystal cell can be controlled by the picture signal control unit 120. When displaying a three-dimensional image on the image display unit 110 as described above, a signal process is executed by the picture signal control unit 120 so that the right eye image is displayed on odd rows of the liquid crystal panel 466 and the left eye image is displayed on even rows. Furthermore, the picture signal control unit 120 may transmit a signal from the picture signal control unit 120 to the timing control unit 140 so that black is displayed on one row of liquid crystal cells positioned at the boundary between the polarization region 469a and the polarization region 469b of the polarization control filter 468. Displaying black on the liquid crystal cells is realized by inputting a brightness signal of 0 gradations.

A row of liquid crystal cells positioned at the boundary between the polarization region 469a and the polarization region 469b of the polarization control filter 468 acts as the black matrix of the polarization control filter 468 by being displayed in black. Therefore, in a case where an image to be perceived by the viewer as a stereoscopic image is displayed, the generation of crosstalk can be suppressed by displaying black on a row of liquid crystal cells positioned at the boundary between the polarization region 469a and the polarization region 469b.

Further, when displaying a three-dimensional image, as can be seen in FIG. 10, by displaying black with a row of liquid crystal cells in which the red liquid crystal cells 472 and the green liquid crystal cells 474 are alternately arranged and a row of liquid crystal cells in which the blue liquid crystal cells 476 and the white liquid crystal cells 478 are alternately arranged respectively with two rows therebetween, the ratio of loss due to the black display is even between the color components (that is, the constituent ratios of red, green, and yellow are the same as when a two-dimensional image is displayed), and crosstalk can be suppressed while limiting a deterioration in the resolution to a minimum without causing a deviation in colors during three-dimensional display.

Figure 11:
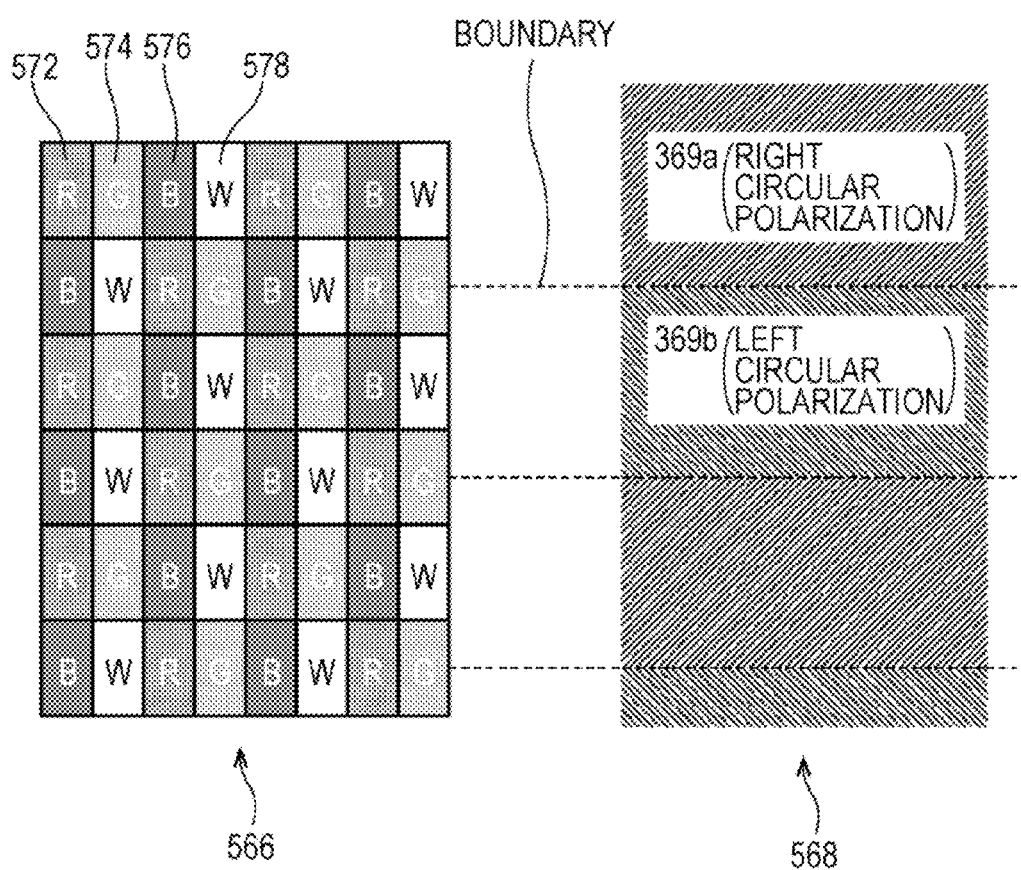
FIG. 11 is a view illustrating still another configuration example of the liquid crystal panel realizing the division of light at a boundary at which the polarization state of the polarization control filter changes without using a black matrix (in a case where an ordinary two-dimensional image is displayed).

Still another configuration example of the liquid crystal panel realizing the division of light at a boundary at which the polarization state of the polarization control filter changes without using a black matrix is illustrated in FIG. 11.

While a unit pixel of a liquid crystal panel 566 illustrated in the drawing configures a unit pixel with two rows and two columns of liquid crystal cells in a similar manner to the example illustrated in FIG. 9, there is a difference in that a so-called PenTile arrangement method is adopted. That is, there is a difference with FIG. 9 in that liquid crystal cells are arranged in the order of red liquid crystal cells 572, green liquid crystal cells 574, blue liquid crystal cells 576, and white liquid crystal cells 578 for each row, and only two colors are arranged in each row. Further, the formation positions of the liquid crystal cells of each color are shifted by two columns each for each row, and for example, a blue liquid crystal cell 576 is formed below a red liquid crystal cell 574, and a white liquid crystal cell 578 is formed below a green liquid crystal cell 574.

Further, a polarization control filter 568 is also illustrated in FIG. 11 along with the liquid crystal panel 566. While the liquid crystal panel 466 and the polarization control filter 568 have been drawn horizontally next to each other for convenience of description, the polarization control filter 568 is placed on the front face (viewer side) of the liquid crystal panel 566 in an actual display device 100.

The polarization control filter 568 is configured by alternately arranging a polarization region 569a circularly polarizing in the right circular polarization direction and a polarization region 569b circularly polarizing in the left circular polarization direction, in the vertical direction. In the drawing, the difference in the direction of circular polarization of each region is represented by diagonal lines. The polarization regions 569a and 569b both have widths of two rows of pixels. Furthermore, the polarization control filter 568 is placed so that a boundary between the polarization region 569a and the polarization region 569b is within the range of a row of liquid crystal cells with one row of liquid crystal cells therebetween.

In a case where an ordinary two-dimensional image is displayed on the display device 100, as illustrated in FIG. 11, the image is displayed on the liquid crystal panel 566 on the liquid crystal cells 572, 574, 576, and 578 of all rows. It can be seen that there is no black matrix in a case where an ordinary image is displayed on the display device 100. By displaying an ordinary image on the display device 100 in such a manner, an image with greater brightness than in a case where the black matrix 14c is used in the polarization control filter (refer to FIG. 17) can be displayed on the image display unit 110.

Figure 12:
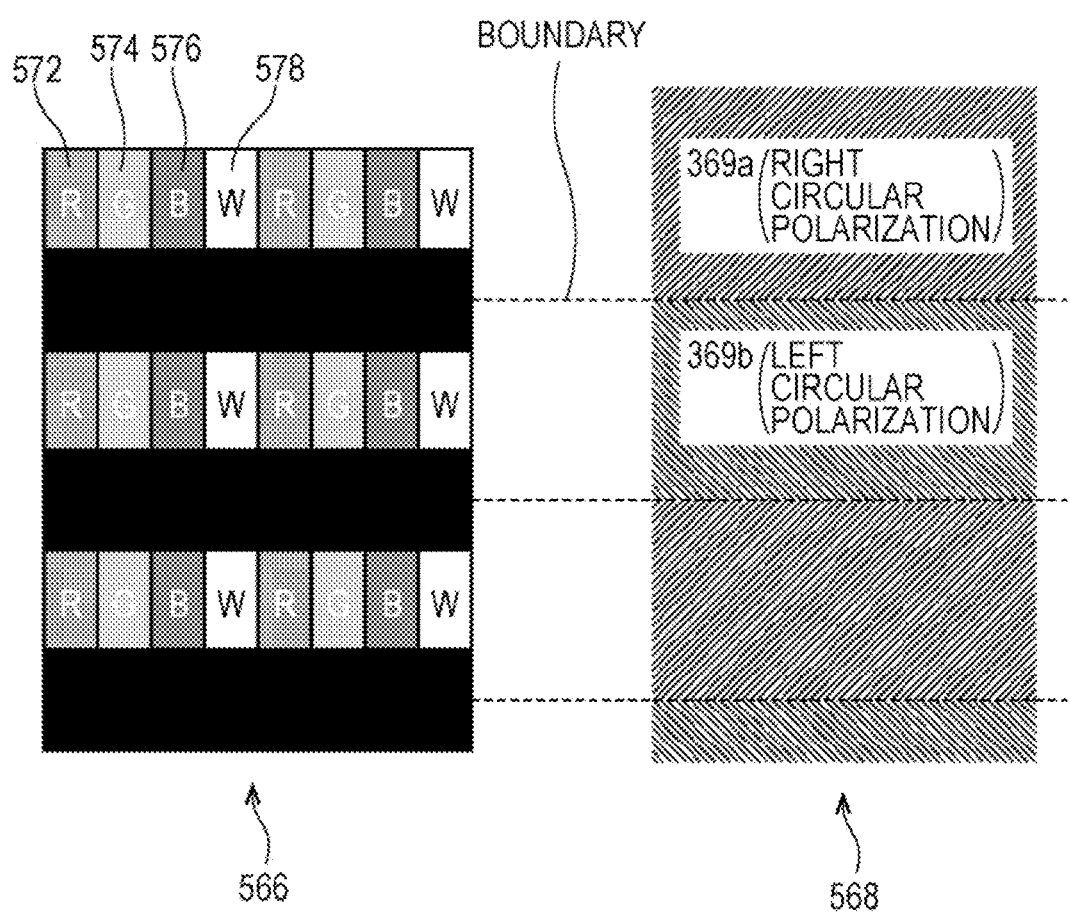
FIG. 12 is a view illustrating still another configuration example of the liquid crystal panel realizing the division of light at a boundary at which the polarization state of the polarization control filter changes without using a black matrix (in a case where a three-dimensional image is displayed).

On the other hand, in a case where an image to be perceived by the viewer as a stereoscopic image (three-dimensional image) is displayed on the display device 100, as illustrated in FIG. 12, black is displayed by a row of liquid crystal cells positioned at a boundary between the polarization region 569a and the polarization region 569b of the polarization control filter 568, and the regular image is displayed by other rows of liquid crystal cells away from the boundary between the polarization region 569a and the polarization region 569b of the polarization control filter 568. As can be seen in FIG. 12, black is displayed with one row of liquid crystals therebetween.

The display of each liquid crystal cell can be controlled by the picture signal control unit 120. When displaying a three-dimensional image on the image display unit 110 as described above, a signal process is executed by the picture signal control unit 120 so that the right eye image is displayed on odd rows of the liquid crystal panel 566 and the left eye image is displayed on even rows. Furthermore, the picture signal control unit 120 may transmit a signal from the picture signal control unit 120 to the timing control unit 140 so that black is displayed on one row of liquid crystal cells positioned at the boundary between the polarization region 569a and the polarization region 569b of the polarization control filter 568. Displaying black on the liquid crystal cells is realized by inputting a brightness signal of 0 gradations.

A row of liquid crystal cells positioned at the boundary between the polarization region 569a and the polarization region 569b of the polarization control filter 568 act as the black matrix of the polarization control filter 568 by being displayed in black. Therefore, in a case where an image to be perceived by the viewer as a stereoscopic image is displayed, the generation of crosstalk can be suppressed by displaying black on a row of liquid crystal cells positioned at the boundary between the polarization region 569a and the polarization region 569b. Further, since the ratio of loss due to the black display is even between the color components (that is, the constituent ratios of red, green, and yellow are the same as when a two-dimensional image is displayed), a deviation in colors during three-dimensional display does not have to occur.

Figure 13:
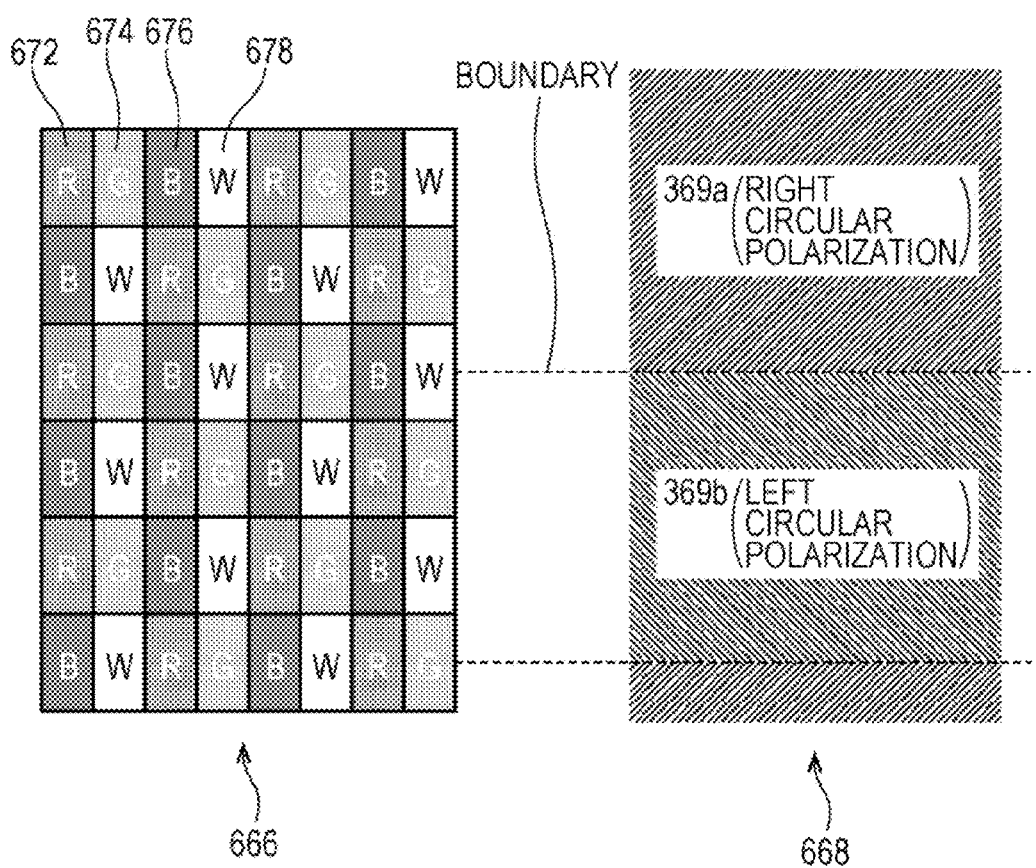
FIG. 13 is a view illustrating still another configuration example of the liquid crystal panel realizing the division of light at a boundary at which the polarization state of the polarization control filter changes without using a black matrix (in a case where an ordinary two-dimensional image is displayed).

Still another configuration example of the liquid crystal panel realizing the division of light at a boundary at which the polarization state of the polarization control filter changes without using a black matrix is illustrated in FIG. 13. The PenTile arrangement method has been adopted as a liquid crystal panel 666 illustrated in the drawing in a similar manner to the example illustrated in FIG. 11. Further, while a polarization control filter 668 is also illustrated in FIG. 13 along with the liquid crystal panel 566, there is a difference with FIG. 11 in that the polarization control filter 568 is placed so that polarization regions 669a and 669b both have a width of three rows full of liquid crystals and a boundary between the polarization region 669a and the polarization region 669b is within the range of one row of liquid crystal cells with two rows of liquid crystals therebetween.

In a case where an ordinary two-dimensional image is displayed on the display device 100, similarly to above, the image is displayed on the liquid crystal panel 566 on all of the liquid crystal cells 672, 674, 676, and 678 of all rows. A two-dimensional image with greater brightness can be displayed on the image display unit 110 since there is no black matrix.

Figure 14:
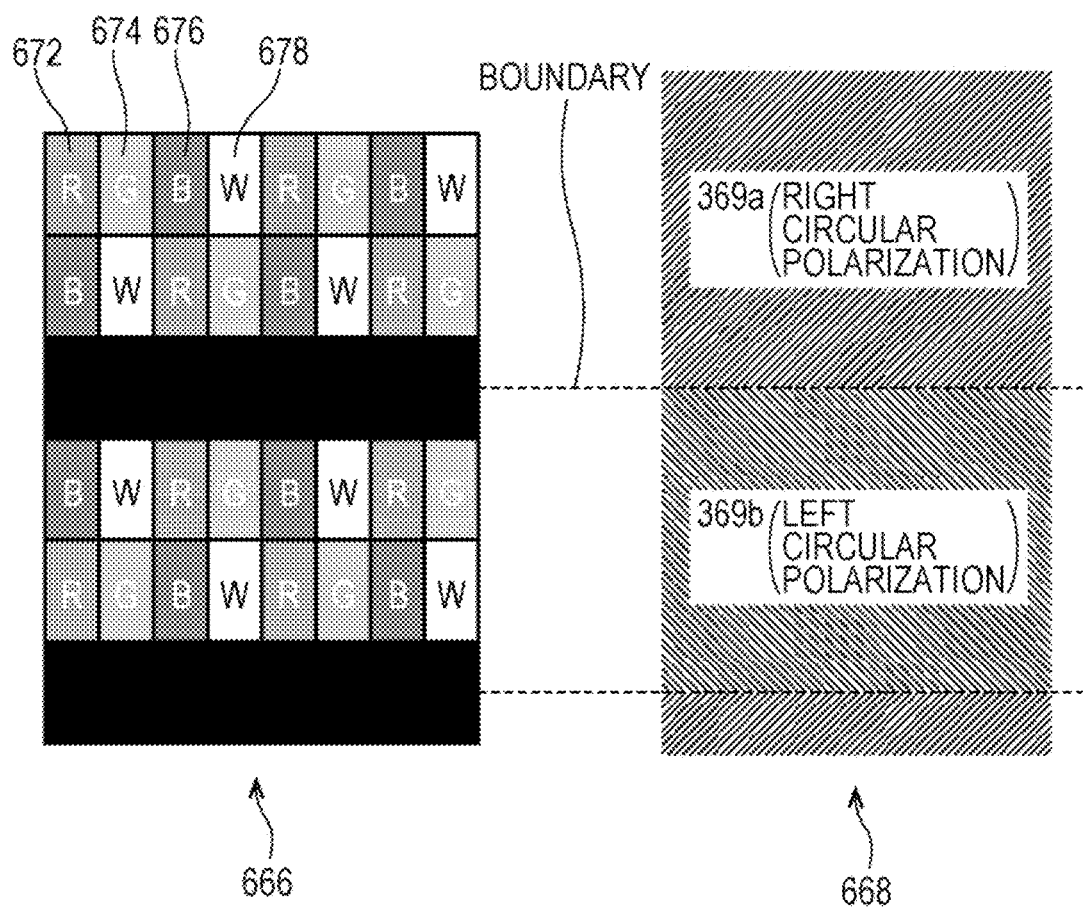
FIG. 14 is a view illustrating still another configuration example of the liquid crystal panel realizing the division of light at a boundary at which the polarization state of the polarization control filter changes without using a black matrix (in a case where a three-dimensional image is displayed).
Figure 15:
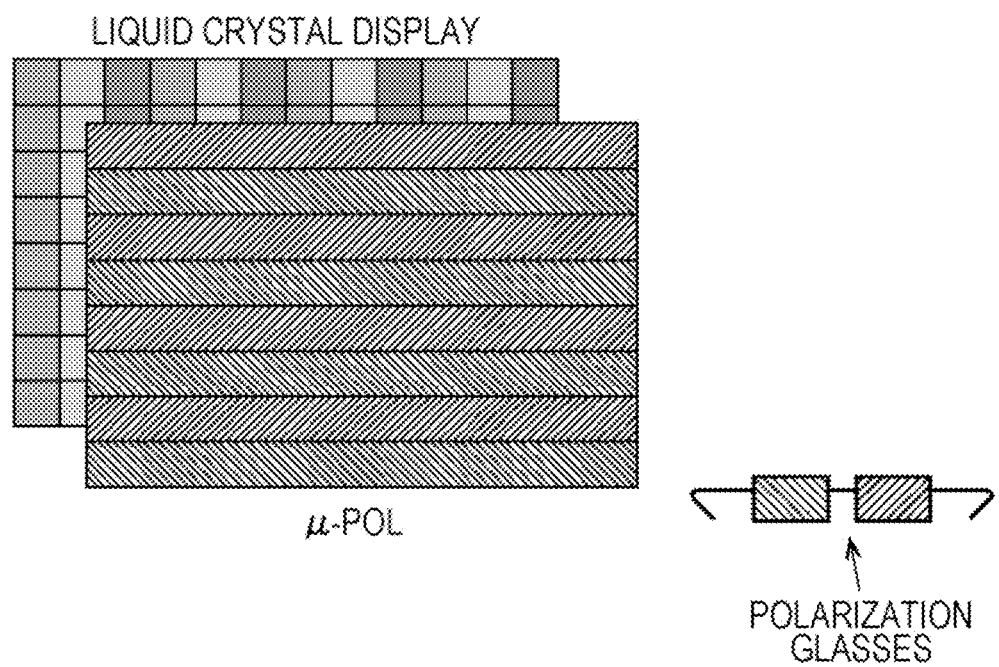
FIG. 15 is a view for describing a display method of a three-dimensional image through a polarization method using μ-pols.
Figure 16:
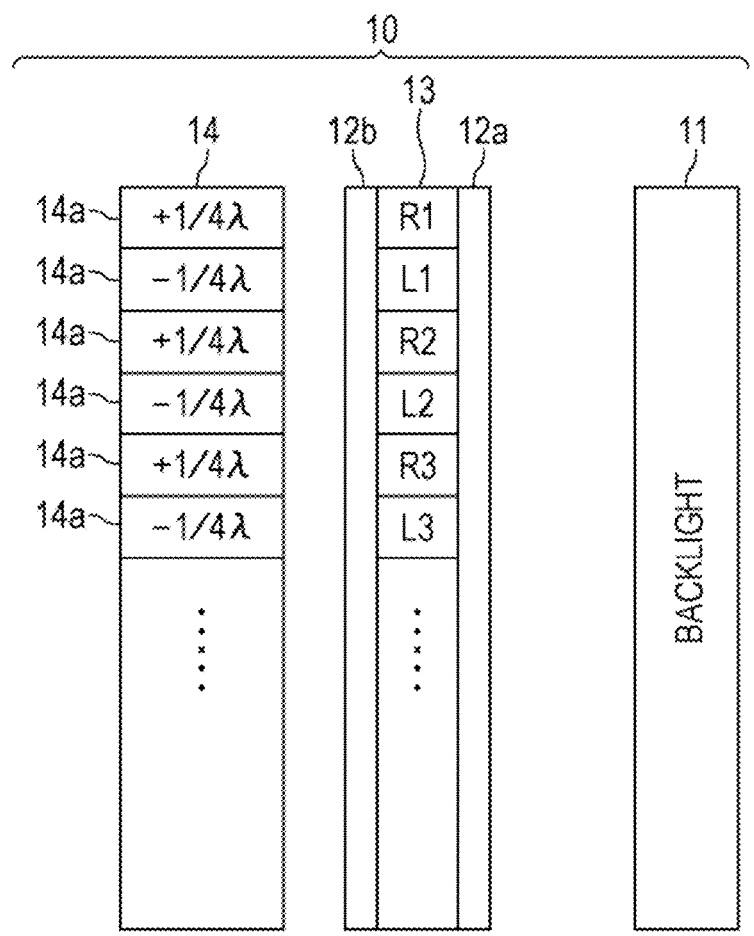
FIG. 16 is a view for describing the principle of separating the left eye image and the right eye image through a polarization method using μ-pols.

On the other hand, in a case where an image to be perceived by the viewer as a stereoscopic image (three-dimensional image) is displayed on the display device 100, as illustrated in FIG. 14, black is displayed by a row of liquid crystal cells positioned at a boundary between the polarization region 669a and the polarization region 669b of the polarization control filter 668, and the regular image is displayed by other rows of liquid crystal cells away from the boundary between the polarization region 669a and the polarization region 569b of the polarization control filter 668. As can be seen in FIG. 14, black is displayed with two rows of liquid crystals therebetween.

A row of liquid crystal cells positioned at the boundary between the polarization region 669a and the polarization region 669b of the polarization control filter 668 act as the black matrix of the polarization control filter 668 by being displayed in black. Therefore, in a case where an image to be perceived by the viewer as a stereoscopic image is displayed, the generation of crosstalk can be suppressed by displaying black on a row of liquid crystal cells positioned at the boundary between the polarization region 669a and the polarization region 669b. Further, since the ratio of loss due to the black display is even between the color components (that is, the constituent ratios of red, green, and yellow are the same as when a two-dimensional image is displayed), a deviation in colors during three-dimensional display does not have to occur.

When FIGS. 12 and 14 are compared, the former can increase the resolution in the vertical direction, and the latter can increase the resolution in the horizontal direction.

INDUSTRIAL APPLICABILITY

Details of the present invention have been described above while referring to specific embodiments. However, it is clear that those skilled in the art may revise or substitute the embodiments without departing from the gist of the present invention.

While an embodiment of applying the present invention to a liquid crystal display has been described in the present specification, the gist of the present invention is not limited thereto. For example, the present invention can be similarly applied to other displays such as an OLED or an LED configured by forming a pixel by cells of a plurality of color components and sequentially arranging a plurality of pixels in the horizontal direction and the vertical direction.

Further, other than television sets, the present invention can be applied to a monitor used connected to a personal computer or another electronic apparatus, a mobile game console, a mobile phone, or a mobile music reproduction device. Further, the present invention can be compatible with the driving methods of display panels such as the TN method, the VA method, or the IPS method.

In other words, the present invention has been disclosed in the form of examples, and the description content of the present specification is not to be interpreted as being limiting. The scope of the claims is to be consulted to determine the gist of the present invention.

REFERENCE SIGNS LIST

100 DISPLAY DEVICE
110 IMAGE DISPLAY UNIT
112 LIQUID CRYSTAL PANEL
113 GATE DRIVER
114 DATA DRIVER
120 PICTURE SIGNAL CONTROL UNIT
140 TIMING CONTROL UNIT
162 LIGHT SOURCE
164a, 164b POLARIZING PLATE
166, 266, 366, 466, 566, 666 LIQUID CRYSTAL PANEL
168, 268, 368, 468, 568, 668 POLARIZATION CONTROL FILTER
169a, 269a, 369a, 469a, 569a, 669a POLARIZATION REGION (RIGHT CIRCULAR POLARIZATION)
169b, 269b, 369b, 469b, 569b, 669b POLARIZATION REGION (LEFT CIRCULAR POLARIZATION)
172, 272, 372, 472, 572, 672 RED LIQUID CRYSTAL CELL
173a, 173b SUB CELL (RED)
175a, 175b SUB CELL (GREEN)
176a, 176b SUB CELL (BLUE)
174, 274, 374, 474, 574, 674 GREEN LIQUID CRYSTAL CELL
176, 276, 376, 476, 576, 676 BLUE liquid CRYSTAL CELL

The invention claimed is:

1. A display device comprising: a display panel configured by sequentially arranging a plurality of pixels in a horizontal direction and a vertical direction with one pixel being formed by a plurality of color component cells including cells of red, green, and blue, and another color other than red, green, and blue in two rows and two columns such that in the horizontal direction only two of the red, green, blue and another color cells are in a first single row and only the other two of the red, green, blue and another color cells are in a second single row,
    said display panel including a bus line, and said display panel configured to display a two-dimensional image or a three-dimensional image through an application of a signal to the bus line;
    a polarization control filter arranged in front of the display panel as viewed by a viewer of the display panel, and configured to alternately change a polarization state of light transmitting the display panel for every predetermined horizontal region and such that each boundary at which the polarization state changes is within a range of every row of cells with two rows of cells therebetween; and
    a signal control unit configured to control the signal applied to the bus line when displaying the two-dimensional image or the three-dimensional image on the display panel,
    the signal control unit is further configured to control the application of the signal to the bus line when displaying a three-dimensional image so that each row of cells with two rows therebetween positioned at the boundary at which the polarization state of the polarization control filter changes is displayed in black, and
    said display device being configured without a black matrix.

2. A display device comprising:
- a display panel configured by sequentially arranging a plurality of pixels in a horizontal direction and a vertical direction with one pixel being formed by a plurality of color component cells including cells of red, green, and blue, and a color other than red, green, and blue, said display panel including a bus line, and said display panel configured to display a two-dimensional image or a three-dimensional image through an application of a signal to the bus line;
- a polarization control filter arranged in front of the display panel as viewed by a viewer of the display panel, and configured to alternately change a polarization state of light transmitting the display panel for every predetermined horizontal region and such that each boundary at which the polarization state changes is within a range of every row of cells with two rows of cells therebetween; and
- a signal control unit configured to control the signal applied to the bus line when displaying the two-dimensional image or the three-dimensional image on the display panel,
- the plurality of color component cells within the display panel are arranged (i) in the horizontal direction so as to have a red cell, a green cell, a blue cell and a white cell in a single row and (ii) in the vertical direction so as to have to have only two color cells in a single column,
- the signal control unit is further configured to control the application of the signal to the bus line when displaying a three-dimensional image so that each row of cells with two rows therebetween positioned at the boundary at which the polarization state of the polarization control filter changes is displayed in black, and
- said display device being configured without a black matrix.

3. The display device according to claim 2, in which the display panel is configured such that a respective position of each color cell is shifted by two columns for each row of cells.

* * * * *